US012647462B2

(12) United States Patent
Howe

(10) Patent No.: US 12,647,462 B2
(45) Date of Patent: Jun. 2, 2026

(54) SYSTEMS AND METHODS FOR INTELLIGENT APPLICATION DEFINITION AND PROTECTION

(71) Applicant: Zscaler, Inc., San Jose, CA (US)

(72) Inventor: Nathan Howe, Frankfurt (DE)

(73) Assignee: Zscaler, Inc., San Jose, CA (US)

( * ) Notice: Subject to any disclaimer, the term of this patent is extended or adjusted under 35 U.S.C. 154(b) by 240 days.

(21) Appl. No.: 18/507,436

(22) Filed: Nov. 13, 2023

(65) Prior Publication Data

US 2025/0159022 A1     May 15, 2025

(51) Int. Cl.
H04L 9/40 (2022.01)

(52) U.S. Cl.
CPC ............ H04L 63/20 (2013.01); H04L 63/102 (2013.01)

(58) Field of Classification Search
CPC ....... H04L 63/20; H04L 63/102; H04L 63/10; H04L 41/0894; H04L 63/1433; H04L 63/101; H04L 63/0236; G06F 21/577; H04W 12/00
See application file for complete search history.

(56) References Cited

U.S. PATENT DOCUMENTS 11,596,027 B2    2/2023  Howe
11,765,593 B2    9/2023  Howe et al.

| 2002/0066033 A1* | 5/2002 | Dobbins | H04L 67/02 |
| | | | 726/4 |
| 2019/0236661 A1* | 8/2019 | Hogg | G06F 16/9537 |
| 2021/0314338 A1 | 10/2021 | Howe | |
| 2022/0286428 A1 | 9/2022 | Howe et al. | |
| 2022/0286429 A1 | 9/2022 | Howe et al. | |
| 2022/0286854 A1 | 9/2022 | Howe et al. | |
| 2022/0286894 A1 | 9/2022 | Howe et al. | |
| 2022/0286911 A1 | 9/2022 | Howe et al. | |
| 2022/0286912 A1 | 9/2022 | Howe et al. | |
| 2022/0408255 A1 | 12/2022 | Howe | |

FOREIGN PATENT DOCUMENTS

CN          110955528 A  *  4/2020  ............. G06F 9/451

* cited by examiner

*Primary Examiner* — Ali S Abyaneh

(74) *Attorney, Agent, or Firm* — Baratta Law PLLC; Lawrence A. Baratta, Jr.; Ryan Odessa

(57)     ABSTRACT

Systems and methods for intelligent application definition and protection. In various embodiments, steps include receiving a destination service definition from a customer; performing an assessment of the destination service to determine one or more policies to use for the destination service; responsive to receiving a request from a user to access the destination service, directing the request to a control layer, and enforcing one or more controls on the request based on the one or more policies; and providing access to the destination service to the user based on the one or more controls.

18 Claims, 38 Drawing Sheets

Company A

Company B

Company A

Company B

800

RECEIVING A REQUEST FROM A USER TO ACCESS A DESTINATION
SERVICE                                                                    802

DIRECTING THE REQUEST TO A CONTROL LAYER                 804

ENFORCING ONE OR MORE CONTROLS, VIA THE CONTROL LAYER, ON
THE REQUEST BASED ON A CONFIGURATION PROVIDED BY AN
OWNER OF THE DESTINATION SERVICE                                      806

PROVIDING ACCESS TO THE DESTINATION SERVICE TO THE USER
BASED ON THE ONE OR MORE CONTROLS                              808

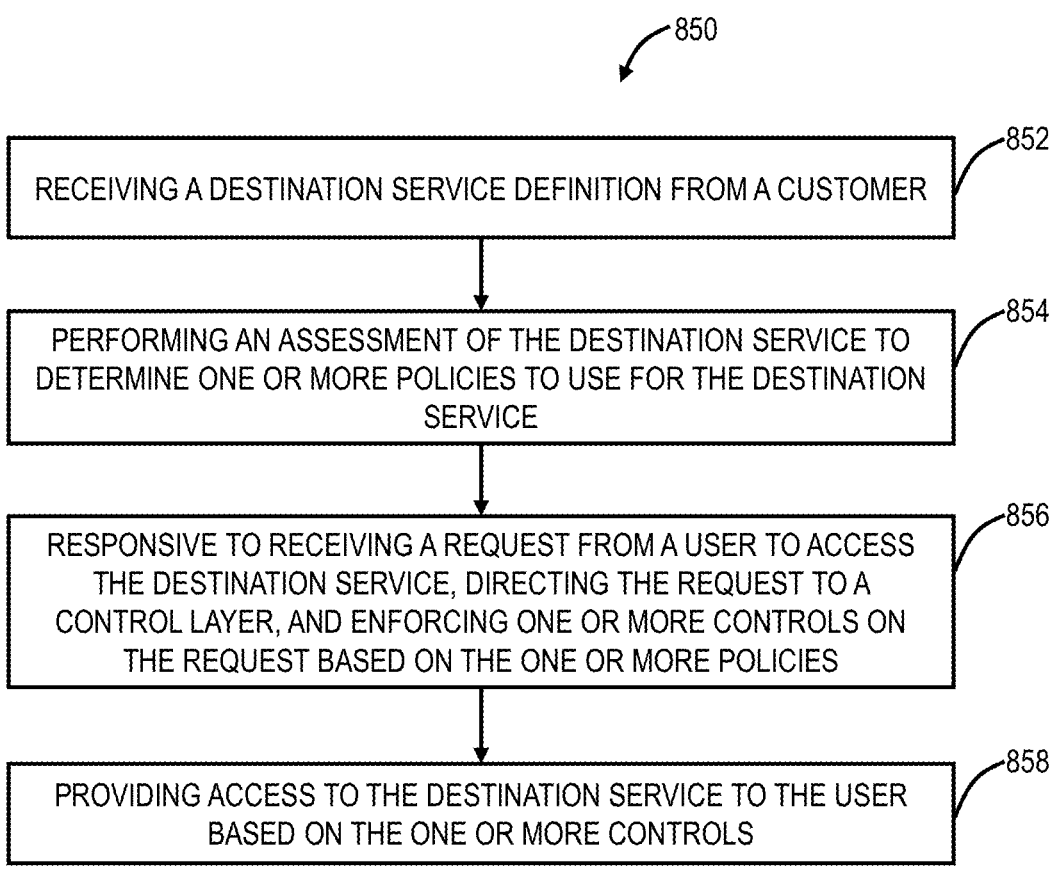

850

RECEIVING A DESTINATION SERVICE DEFINITION FROM A CUSTOMER 852

PERFORMING AN ASSESSMENT OF THE DESTINATION SERVICE TO DETERMINE ONE OR MORE POLICIES TO USE FOR THE DESTINATION SERVICE 854

RESPONSIVE TO RECEIVING A REQUEST FROM A USER TO ACCESS THE DESTINATION SERVICE, DIRECTING THE REQUEST TO A CONTROL LAYER, AND ENFORCING ONE OR MORE CONTROLS ON THE REQUEST BASED ON THE ONE OR MORE POLICIES 856

PROVIDING ACCESS TO THE DESTINATION SERVICE TO THE USER BASED ON THE ONE OR MORE CONTROLS 858

FIG. 31

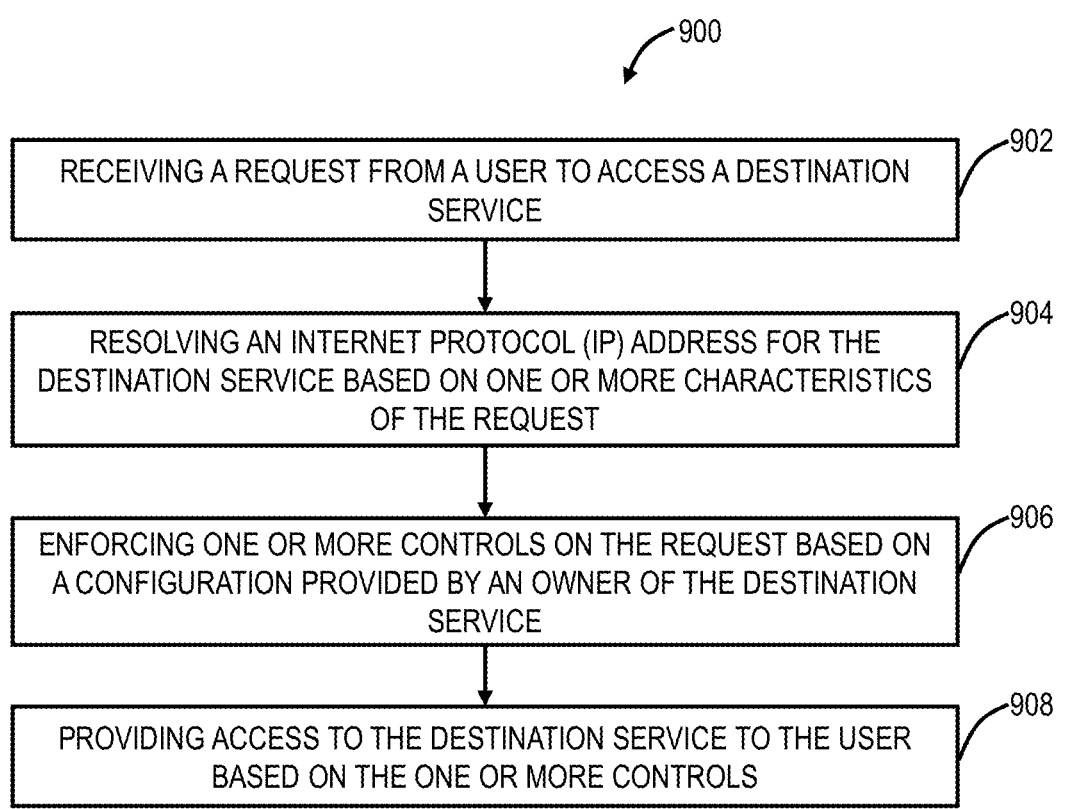

RECEIVING A REQUEST FROM A USER TO ACCESS A DESTINATION SERVICE ~902

RESOLVING AN INTERNET PROTOCOL (IP) ADDRESS FOR THE DESTINATION SERVICE BASED ON ONE OR MORE CHARACTERISTICS OF THE REQUEST ~904

ENFORCING ONE OR MORE CONTROLS ON THE REQUEST BASED ON A CONFIGURATION PROVIDED BY AN OWNER OF THE DESTINATION SERVICE ~906

PROVIDING ACCESS TO THE DESTINATION SERVICE TO THE USER BASED ON THE ONE OR MORE CONTROLS ~908

FIG. 38

SHARED NETWORK ROUTE

~102

402, 404

ANY TRAFFIC ⟶          WAF          ALLOWED TRAFFIC ⟶

LISTENER                LISTENER

ALLOW

BLOCK

CONTROL WAF
POLICY

SYSTEMS AND METHODS FOR INTELLIGENT APPLICATION DEFINITION AND PROTECTION

FIELD OF THE DISCLOSURE

The present disclosure relates generally to networking and computing. More particularly, the present disclosure relates to systems and methods for intelligent application definition and protection.

BACKGROUND OF THE DISCLOSURE

In order to deliver a destination service such as an application or website to a target audience or set of consumers, the application is typically required to be made available in a shared network, or over the open internet. Because of this, applications and websites hosted in such a manner are inherently at risk of attack. Such a shared nature allows any initiator the ability to connect to the destination service. The present disclosure provides systems and methods to deliver zero trust protection and control to internet facing services. Various embodiments, based on customer configurations, completely isolate, and protect the destination services and content, thus never exposing the destination service directly to the risk of the Internet.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include receiving a destination service definition from a customer; performing an assessment of the destination service to determine one or more policies to use for the destination service; responsive to receiving a request from a user to access the destination service, directing the request to a control layer, and enforcing one or more controls on the request based on the one or more policies; and providing access to the destination service to the user based on the one or more controls.

The steps can further include providing one or more policy recommendations to the customer based on the assessment. The steps can further include performing ongoing assessments of the destination service at predefined intervals; identifying one or more changes associated with the destination service; and enforcing one or more controls on requests to the destination service based on the changes. The steps can further include providing one or more policy recommendations to the customer based on the changes. Determining the one or more policies to use for the destination service can be based on information associated with the destination service identified during the assessment, wherein the information includes known and unknown information. The destination service can be associated with a domain, wherein the steps further include becoming an authority for a specific subdomain, or all subdomains associated with the domain; and directing requests to the specific subdomain or all subdomains based thereon. The destination service can be a public destination service. The directing can include one of directing the request to the control layer and directing the request directly to the public destination service based on the configuration. The providing access can include stitching a connection between the user and the destination service through an application executing on a device associated with the user, one or more nodes of a cloud-based system, and a lightweight connector associated with the destination service. The destination service can be associated with a domain, wherein the steps further include identifying one or more subdomains associated with the domain; and enforcing the one or more controls on requests to the one or more subdomains.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

FIGS. 17 and 18 are network diagrams of a conventional network setup to share data between two companies (FIG. 17) such as for Merger and Acquisition (M&A) purposes or the like compared to a network setup using virtual private access (FIG. 18).

FIG. 31 is a flow chart of a process for intelligent application definition and protection.

FIG. 38 is a flow chart of a process for dynamic distributed name resolution.

DETAILED DESCRIPTION OF THE DISCLOSURE

Again, the present disclosure relates to systems and methods for directing and enforcing zero trust control on requests to destination services. Various embodiments include, responsive to becoming the authoritative name server for a destination service, directing requests to the destination service based on one or more controls facilitated by a control layer. The various controls can be enforced based on preconfigured policy associated with the destination service and provided by an owner of the destination service. The present systems and methods enable public resources to be hidden from the open internet, thereby providing protection via the various security systems offered by the cloud-based system described herein.

Cloud-based security solutions have emerged, such as Zscaler Internet Access (ZIA) and Zscaler Private Access (ZPA), available from Zscaler, Inc., the applicant and assignee of the present application. ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
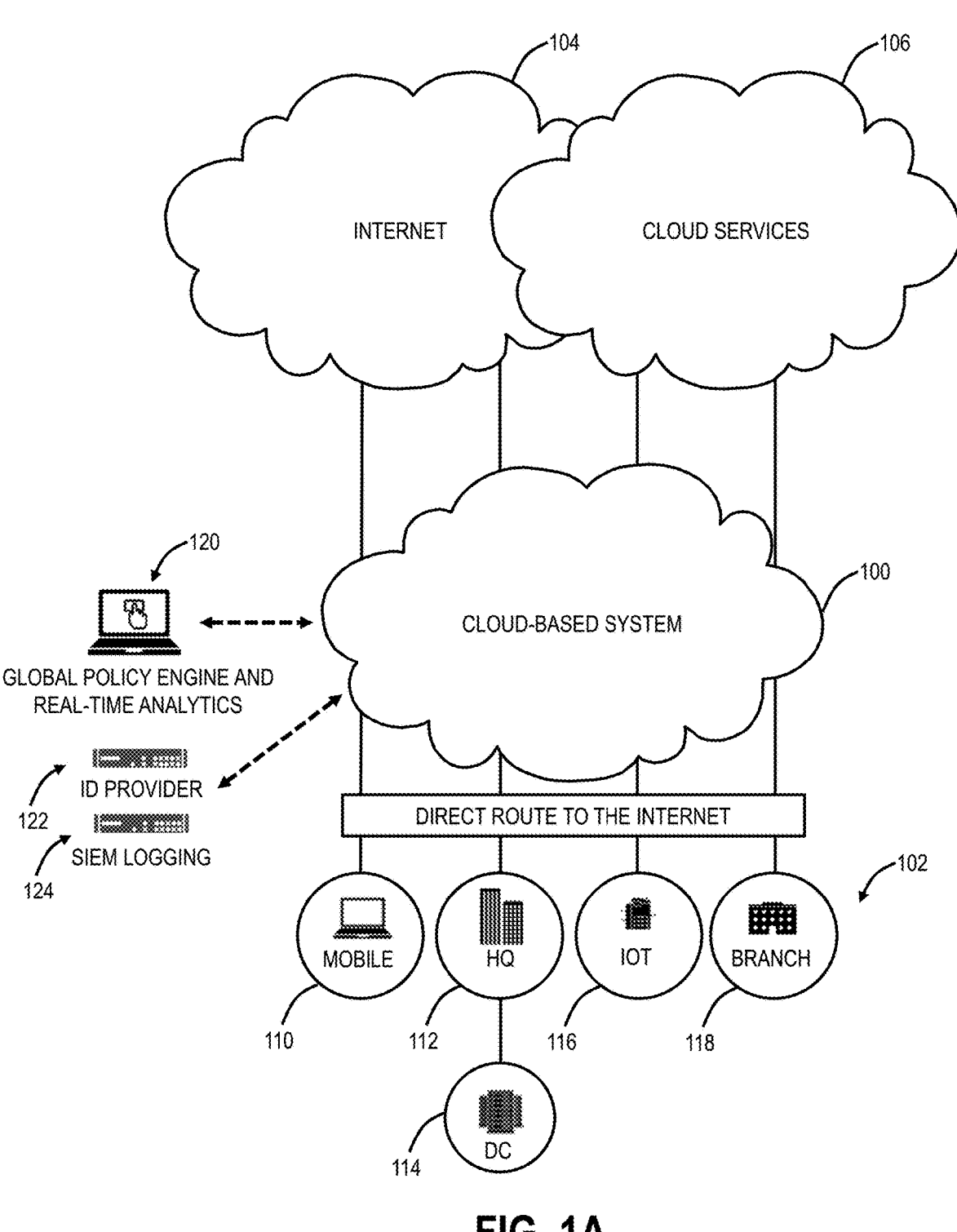
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
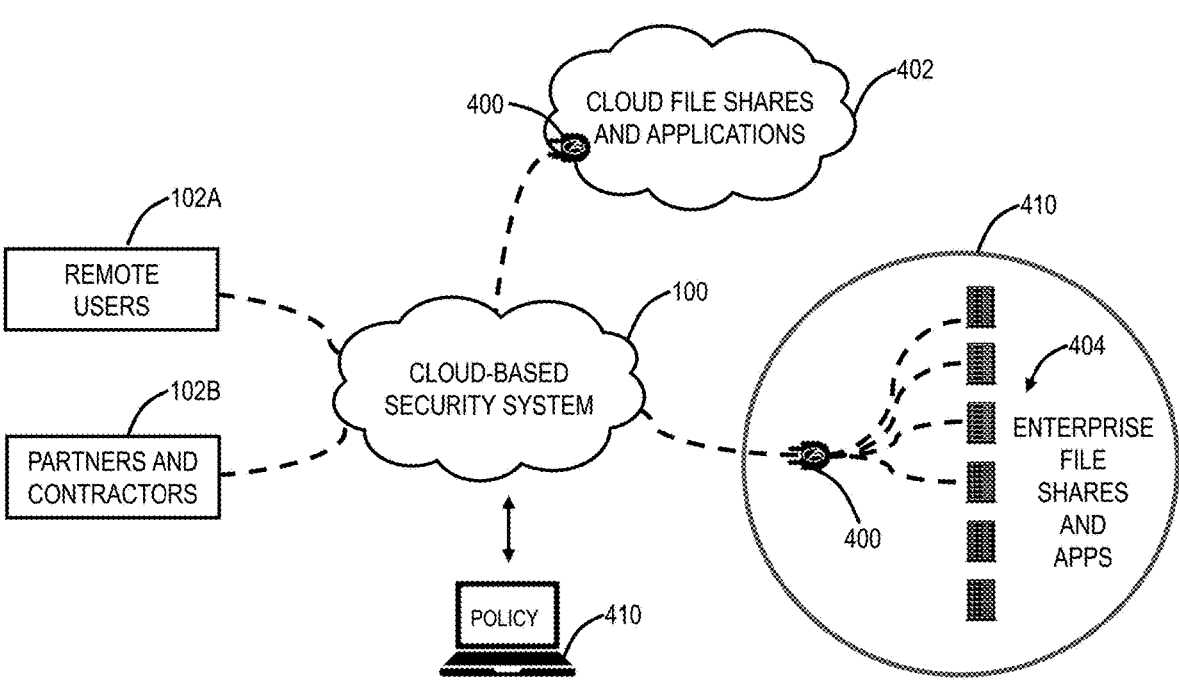
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
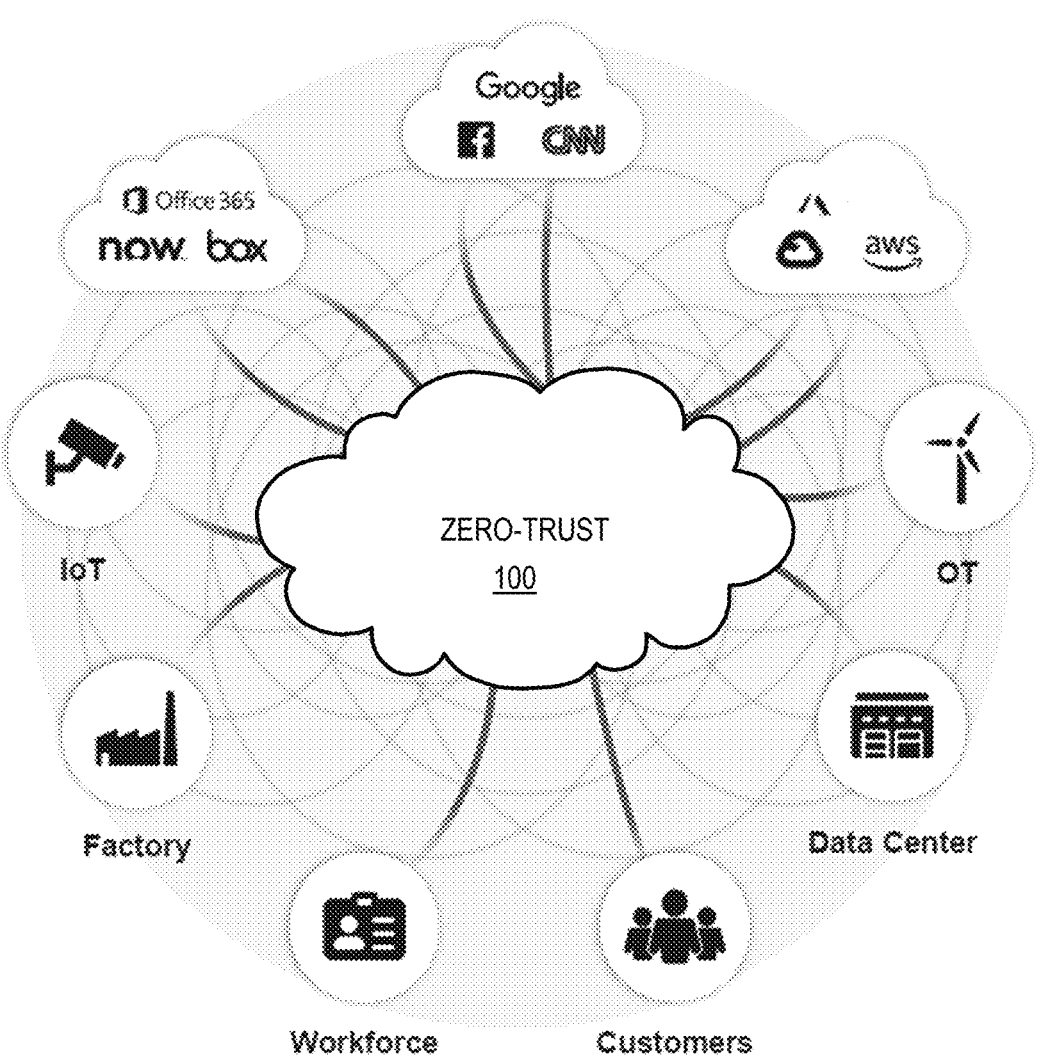
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
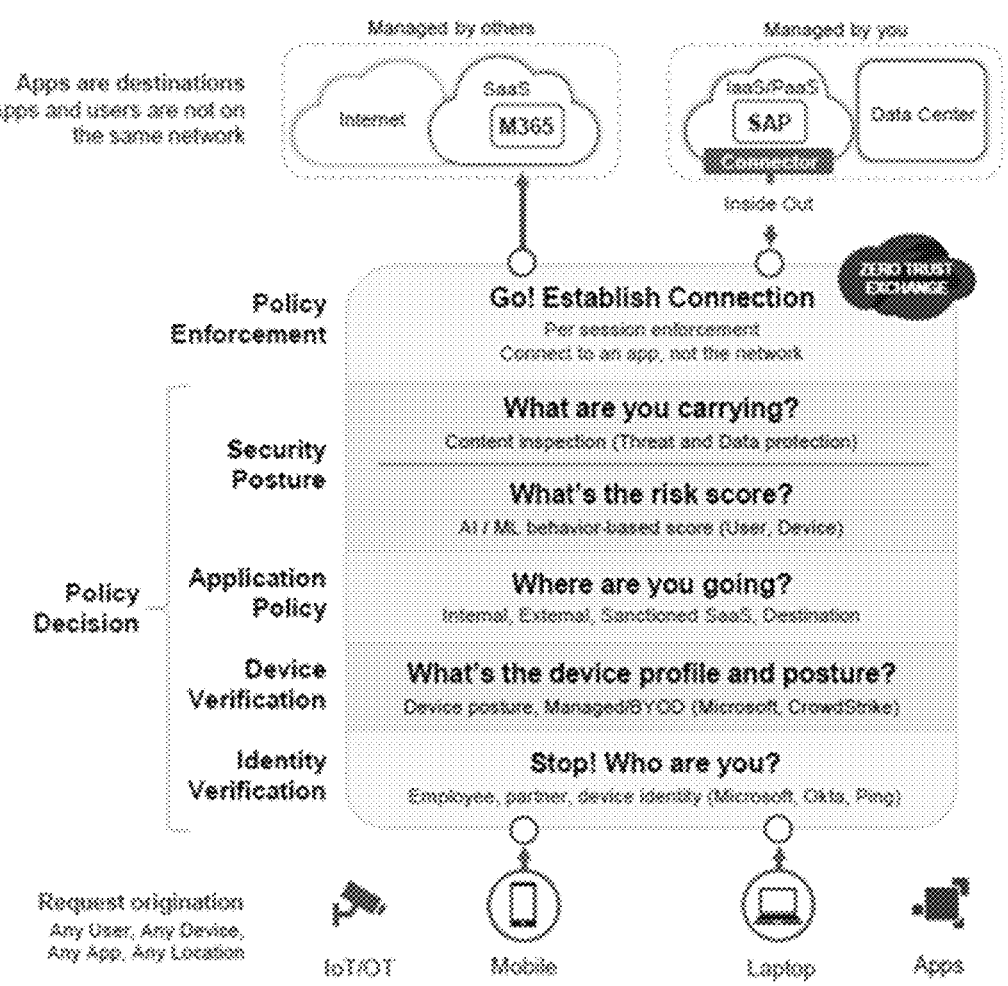
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
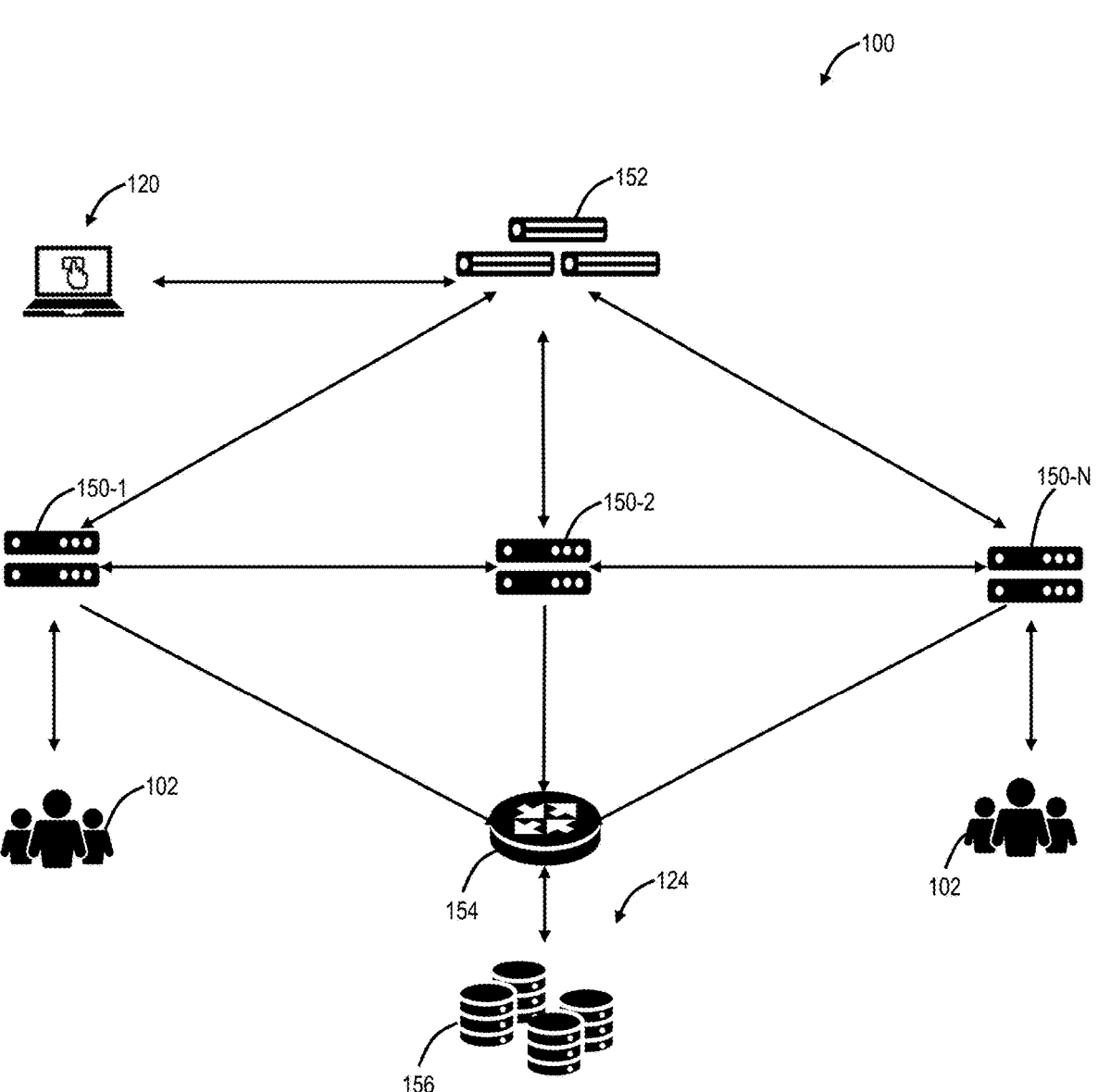
FIG. 2 is a network diagram of an example implementation of the cloud-based system.
Figure 4:
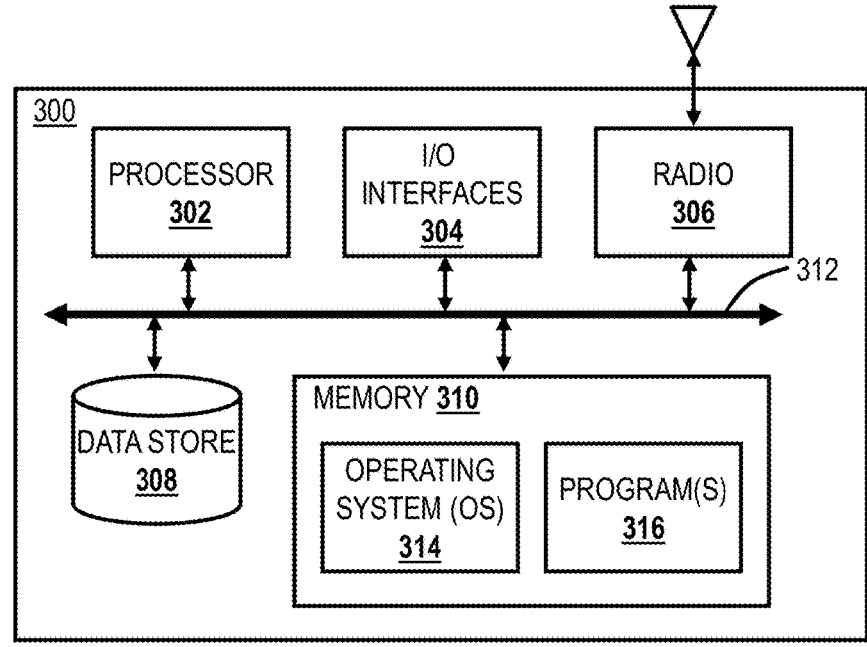

FIG. 2 is a network diagram of an example implementation of the cloud-based system 100. In an embodiment, the cloud-based system 100 includes a plurality of nodes (EN) 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
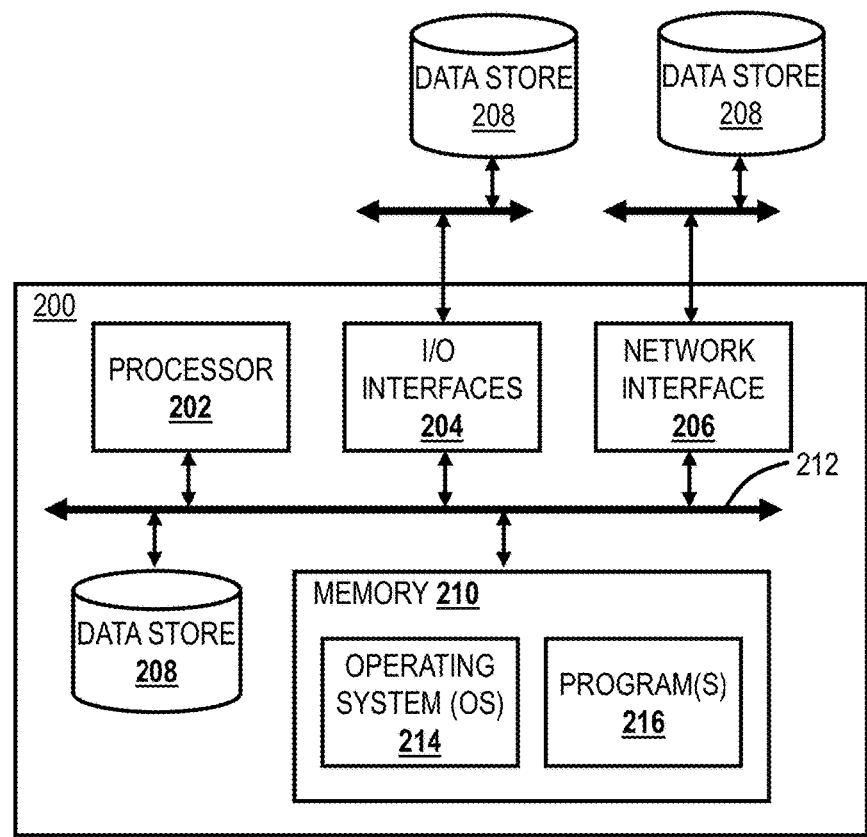
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

User Device Application for Traffic Forwarding and Monitoring

Figure 6:
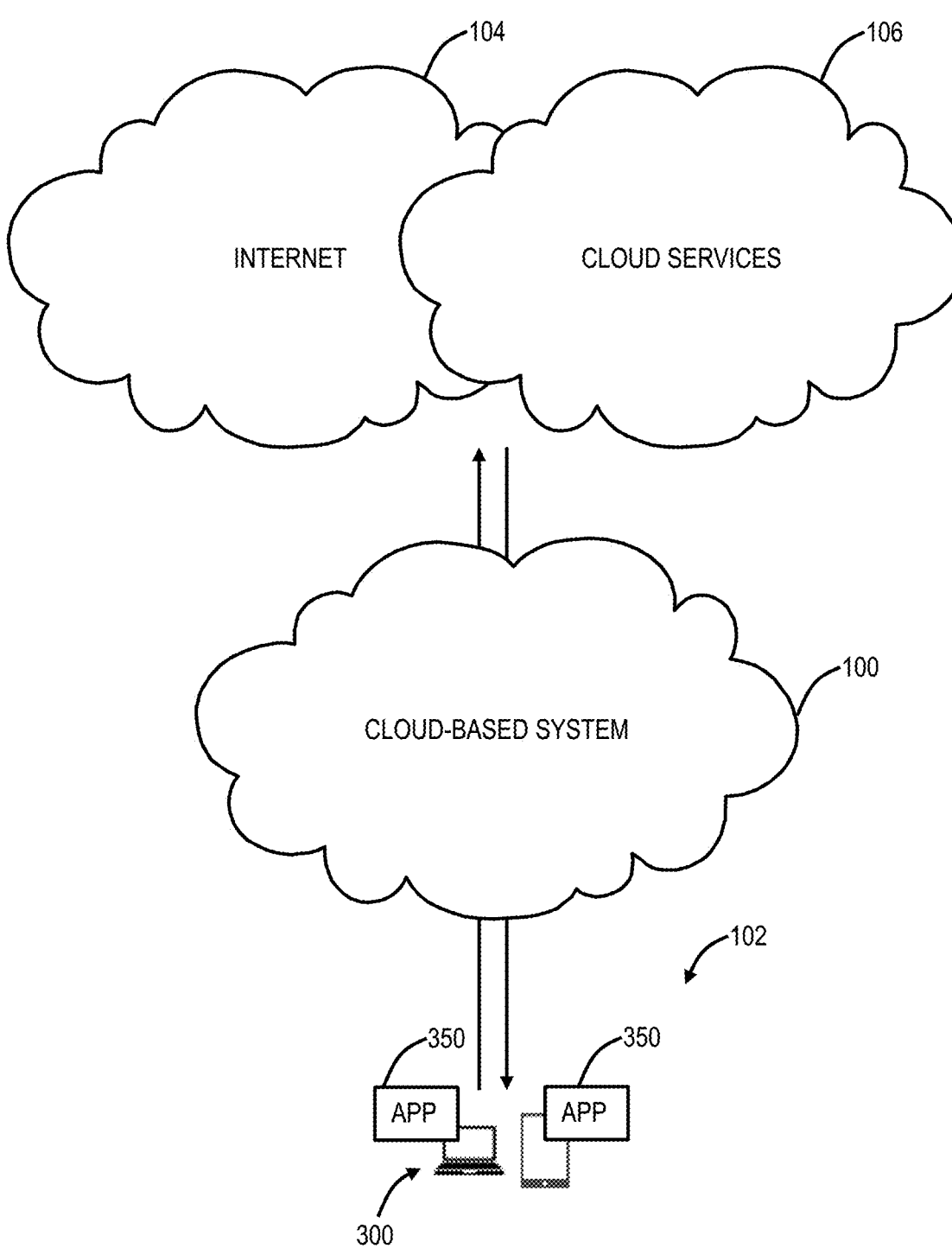
FIG. 6 is a network diagram of the cloud-based system illustrating an application on user devices with users configured to operate through the cloud-based system.

FIG. 6 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

VPN Architecture

Figure 7:
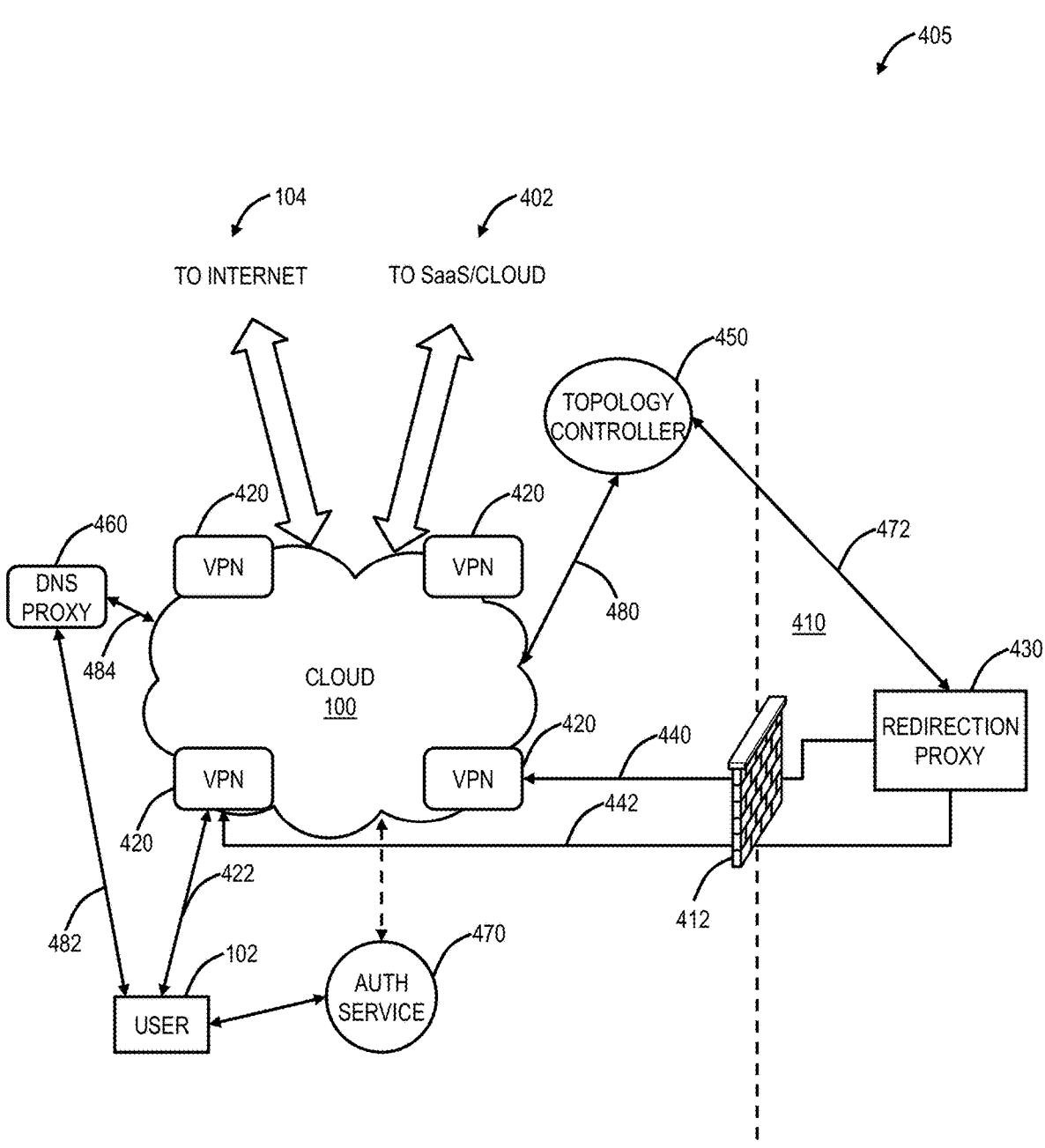
FIG. 7 is a network diagram of a VPN architecture for an intelligent, cloud-based global VPN.

FIG. 7 is a network diagram of a VPN architecture 405 for an intelligent, cloud-based global VPN. For illustration purposes, the VPN architecture 405 includes the cloud-based system 100, the Internet 104, the applications 402 in SaaS/public cloud systems, and the enterprise network 410. The VPN architecture 405 also includes a user 102, which can include any computing device/platform connecting to the cloud-based system 100, the Internet 104, the applications 402, and the enterprise network 410. The VPN architecture 405 includes a single user 102 for illustration purposes, but those of ordinary skill in the art will recognize that the VPN architecture 405 contemplates a plurality of users 102. The user 102 can be a nomadic user, a regional/branch office, etc. That is, the user 102 can be any user of the enterprise network 410 that is physically located outside a firewall 412 associated with the enterprise network 410. The SaaS/public cloud systems can include any systems containing computing and data assets in the cloud such as, for example, Microsoft OneDrive, Google Drive, Dropbox, Apple iCloud, Customer Relationship Management (CRM) systems, SCM, Sales management systems, etc. The enterprise network 410 includes local computing and data assets behind the firewall 412 for additional security on highly confidential assets or legacy assets not yet migrated to the cloud.

The user 102 needs to access the Internet 104, the SaaS/public cloud systems for the applications 402, and the enterprise network 410. Again, conventionally, the solution for secure communication, the user 102 has a VPN connection through the firewall 412 where all data is sent to the enterprise network 410, including data destined for the Internet 104 or the SaaS/public cloud systems for the applications 402. Furthermore, this VPN connection dials into the enterprise network 410. The systems and methods described herein provide the VPN architecture 405, which provides a secure connection to the enterprise network 410 without bringing all traffic, e.g., traffic for the Internet 104 or the SaaS/public cloud systems, into the enterprise network 410 as well as removing the requirement for the user 102 to dial into the enterprise network 410.

Instead of the user 102 creating a secure connection through the firewall 412, the user 102 connects securely to a VPN device 420 located in the cloud-based system 100 through a secure connection 422. Note, the cloud-based system 100 can include a plurality of VPN devices 420. The VPN architecture 405 dynamically routes traffic between the user 102 and the Internet 104, the SaaS/public cloud systems for the applications 402, and securely with the enterprise network 410. For secure access to the enterprise network 410, the VPN architecture 405 includes dynamically creating connections through secure tunnels between three entities: the VPN device 420, the cloud, and an on-premises redirection proxy 430. The connection between the cloud-based system 100 and the on-premises redirection proxy 430 is dynamic, on-demand and orchestrated by the cloud-based system 100. A key feature of the systems and methods is its security at the edge of the cloud-based system 100—there is no need to punch any holes in the existing on-premises firewall 412. The on-premises redirection proxy 430 inside the enterprise network 410 "dials out" and connects to the cloud-based system 100 as if too were an end-point via secure connections 440, 442. This on-demand dial-out capability and tunneling authenticated traffic back to the enterprise network 410 is a key differentiator.

The VPN architecture 405 includes the VPN devices 420, the on-premises redirection proxy 430, a topology controller 450, and an intelligent DNS proxy 460. The VPN devices 420 can be Traffic (VPN) distribution servers and can be part of the cloud-based system 100. In an embodiment, the cloud-based system 100 can be a security cloud such as available from Zscaler, Inc. (www.zscaler.com) performing functions on behalf of every client that connects to it: a) allowing/denying access to specific Internet sites/apps-based on security policy and absence/presence of malware in those sites, and b) set policies on specific SaaS apps and allowing/denying access to specific employees or groups.

The on-premises redirection proxy 430 is located inside a perimeter of the enterprise network 410 (inside the private cloud or inside the corporate data center-depending on the deployment topology). It is connected to a local network and acts as a "bridge" between the users 102 outside the perimeter and apps that are inside the perimeter through the secure connections 440, 442. But, this "bridge" is always closed—it is only open to the users 102 that pass two criteria: a) they must be authenticated by an enterprise authentication service 470, and b) the security policy in effect allows them access to "cross the bridge."

When the on-premises redirection proxy 430 starts, it establishes a persistent, long-lived connection 472 to the topology controller 450. The topology controller 450 connects to the on-premises redirection proxy 430 through a secure connection 472 and to the cloud-based system 100 through a secure connection 480. The on-premises redirection proxy 430 waits for instruction from the topology controller 450 to establish tunnels to specific VPN termination nodes, i.e., the VPN devices 420, in the cloud-based system 100. The on-premises redirection proxy 430 is most expediently realized as custom software running inside a virtual machine (VM). The topology controller 450, as part of the non-volatile data for each enterprise, stores the network topology of a private network of the enterprise network 410, including, but not limited to, the internal domain name(s), subnet(s) and other routing information.

The DNS proxy 460 handles all domain names to Internet Protocol (IP) Address resolution on behalf of endpoints (clients). These endpoints are user computing devices—such as mobile devices, laptops, tablets, etc. The DNS proxy 460 consults the topology controller 450 to discern packets that must be sent to the Internet 104, the SaaS/public cloud systems, vs. the enterprise network 410 private network. This decision is made by consulting the topology controller 450 for information about a company's private network and domains. The DNS proxy 460 is connected to the user 102 through a connection 482 and to the cloud-based system 100 through a connection 484.

The VPN device 420 is located in the cloud-based system 100 and can have multiple points-of-presence around the world. If the cloud-based system 100 is a distributed security cloud, the VPN device 420 can be located with nodes 150. In general, the VPN device 420 can be implemented as software instances on the nodes 150, as a separate virtual machine on the same physical hardware as the nodes 150, or a separate hardware device such as the server 200, but part of the cloud-based system 100. The VPN device 420 is the first point of entry for any client wishing to connect to the Internet 104, SaaS apps, or the enterprise private network. In addition to doing traditional functions of a VPN server, the VPN device 420 works in concert with the topology controller 450 to establish on-demand routes to the on-premises redirection proxy 430. These routes are set up for each user on demand. When the VPN device 420 determines that a packet from the user 102 is destined for the enterprise private network, it encapsulates the packet and sends it via a tunnel between the VPN device 420 and the on-premises redirection proxy 430. For packets meant for the Internet 104 or SaaS clouds, the VPN device 420 can forwards it to the nodes 150—to continue processing as before or send directly to the Internet 104 or SaaS clouds.

VPN Process

Figure 8:
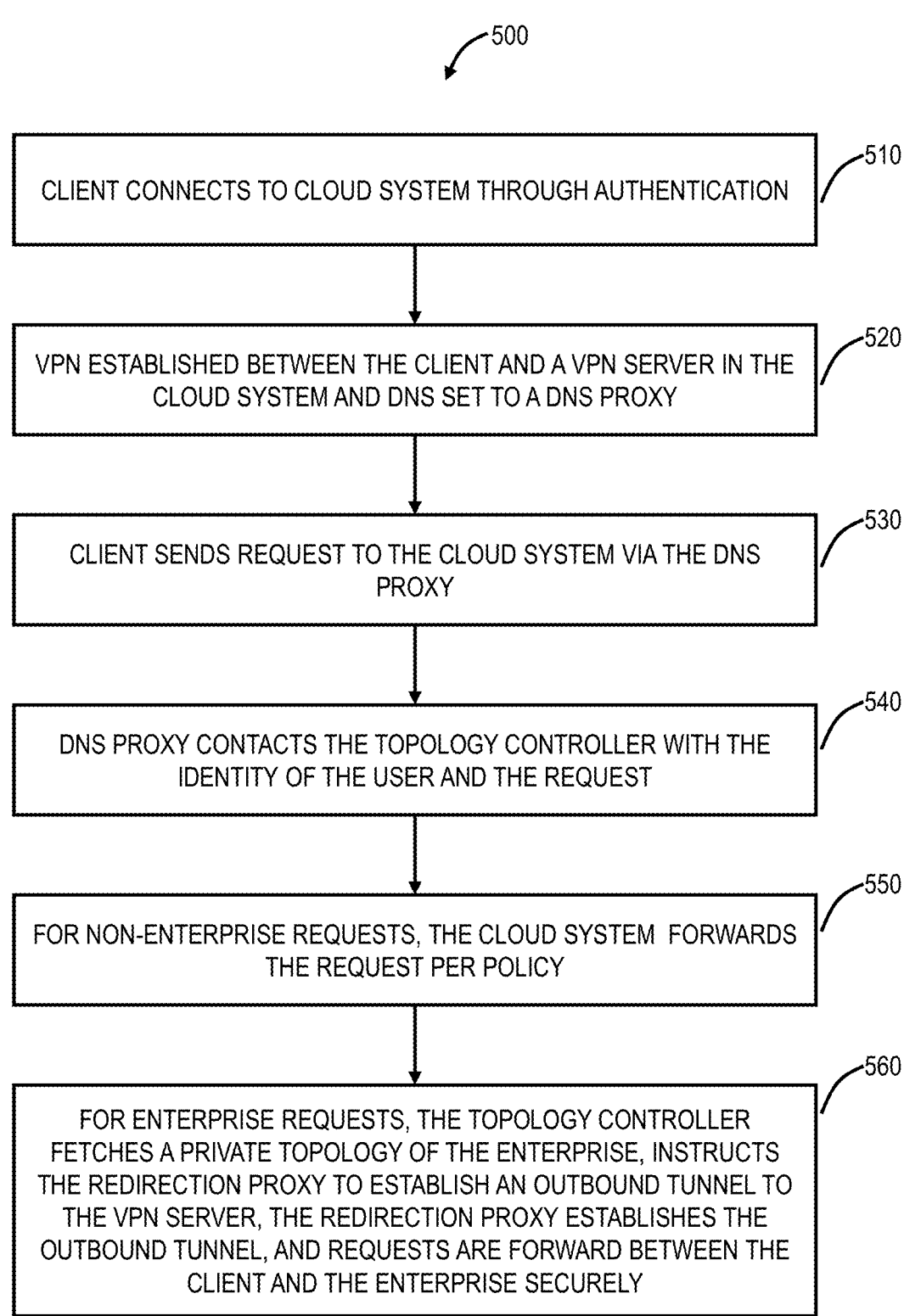
FIG. 8 is a flowchart of a VPN process for an intelligent, cloud-based global VPN.

FIG. 8 is a flowchart of a VPN process 500 for an intelligent, cloud-based global VPN. The VPN process 500 can be implemented through the VPN architecture 405. The VPN process 500 includes the user 102 connecting to the cloud-based system 100 through authentication (step 510). Once the authentication is complete, a VPN is established between the user 102 and a VPN server in the cloud-based system 100 and DNS for the user 102 is set to a DNS proxy 460 (step 520). Now, the user 102 has a secure VPN connection to the cloud-based system 100. Subsequently, the user 102 sends a request to the cloud-based system 100 via the DNS proxy 460 (step 530). Here, the request can be anything-request for the enterprise network 410, the Internet 104, the applications 402 in the SaaS/public cloud systems, the applications 404 in the enterprise network 410, etc. The DNS proxy 460 contacts the topology controller 450 with the identity of the user and the request (step 540). That is, whenever the user 102 wishes to reach a destination (Internet, Intranet, SaaS, etc.), it will consult the DNS proxy 460 to obtain the address of the destination.

For non-enterprise requests, the cloud-based system 100 forwards the request per policy (step 550). Here, the cloud-based system 100 can forward the request based on the policy associated with the enterprise network 410 and the user 102. With the identity of the user and the enterprise they belong to, the VPN server will contact the topology controller 450 and pre-fetch the enterprise private topology. For enterprise requests, the topology controller 450 fetches a private topology of the enterprise network 410, instructs the redirection proxy 430 to establish an outbound tunnel to the VPN server, the redirection proxy 430 establishes the outbound tunnel, and requests are forward between the user 102 and the enterprise network 410 securely (step 560). Here, the DNS proxy 460 works with the topology controller 450 to determine the local access in the enterprise network 410, and the topology controller 450 works with the redirection proxy 430 to dial out a secure connection to the VPN server. The redirection proxy 430 establishes an on-demand tunnel to the specific VPN server so that it can receive packets meant for its internal network.

Global VPN Applications

Advantageously, the systems and methods avoid the conventional requirement of VPN tunneling all data into the enterprise network 410 and hair-pinning non-enterprise data back out. The systems and methods also allow the enterprise network 410 to have remote offices, etc. without requiring large hardware infrastructures—the cloud-based system 100 bridges the users 102, remote offices, etc. to the enterprise network 410 in a seamless manner while removing the requirement to bring non-enterprise data through the enterprise network 410. This recognizes the shift to mobility in enterprise applications. Also, the VPN tunnel on the user 102 can leverage and use existing VPN clients available on the user devices 300. The cloud-based system 100, through the VPN architecture 405, determines how to route traffic for the user 102 efficiently-only enterprise traffic is routed securely to the enterprise network 410. Additionally, the VPN architecture 405 removes the conventional requirement of tunneling into the enterprise network 410, which can be an opportunity for security vulnerabilities. Instead, the redirection proxy 430 dials out of the enterprise network 410.

The systems and methods provide, to the user (enterprise user), a single, seamless way to connect to Public and Private clouds—with no special steps needed to access one vs. the other. To the IT Admin, the systems and methods provide a single point of control and access for all users-security policies and rules are enforced at a single global cloud chokepoint-without impacting user convenience/performance or weakening security.

Virtual Private Access Via the Cloud

Figure 9:
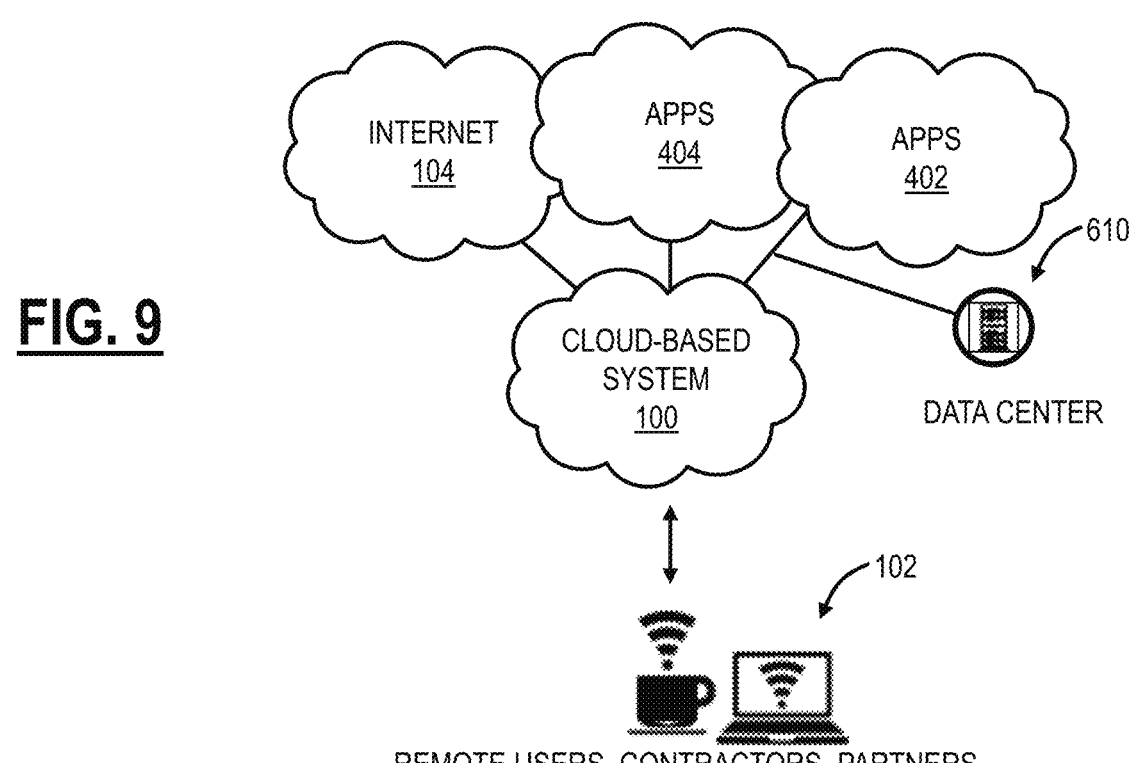
FIG. 9 is a network diagram illustrating the cloud-based system with private applications and data centers connected thereto to provide virtual private access through the cloud-based system.

FIG. 9 is a network diagram illustrating the cloud-based system 100 with private applications 402, 404 and data centers 610 connected thereto to provide virtual private access through the cloud-based system 100. In an aspect, the virtual private access described herein leverages the cloud-based system 100 to enable various users 102 including remote users, contractors, partners, business customers, etc., i.e., anyone who needs access to the private applications 402, 404 and the data centers 610 access, without granting unfettered access to the internal network, without requiring hardware or appliances, and in a seamless manner from the users' 102 perspective. The private applications 402, 404 include applications dealing with financial data, personal data, medical data, intellectual property, records, etc., that is the private applications 404 can be available on the enterprise network 410, but not available remotely except conventionally via VPN access. Examples of the private applications 402, 404 can include Customer Relationship Management (CRM), sales automation, financial applications, time management, document management, etc. Also, the applications 402, 404 can be B2B applications or services as described herein.

The virtual private access is a new technique for the users 102 to access the file shares and applications 402, 404, without the cost, hassle or security risk of VPNs, which extend network access to deliver app access. The virtual private access decouples private internal applications from the physical network to enable authorized user access to the file shares and applications 402, 404, without the security risk or complexity of VPNs. That is, virtual private access takes the "Network" out of VPNs.

In the virtual private access, the users 102, the file shares and applications 402, 404, are communicatively coupled to the cloud-based system 100, such as via the Internet 104 or the like. On the client-side, at the users 102, the applications 402, 404 provision both secure remote access and optionally accessibility to the cloud-based system 100. The application 402, 404 establishes a connection to the closest node 150 in the cloud-based system 100 at startup and may not accept incoming requests.

At the file shares and applications 402, 404, the lightweight connectors 400 sit in front of the applications 402, 404. The lightweight connectors 400 become the path to the file shares and applications 402, 404 behind it, and connect only to the cloud-based system 100. The lightweight connectors 400 can be lightweight, ephemeral binary, such as deployed as a virtual machine, to establish a connection between the file shares and applications 402, 404 and the cloud-based system 100, such as via the closest node 150. The lightweight connectors 400 do not accept inbound connections of any kind, dramatically reducing the overall threat surface. The lightweight connectors 400 can be enabled on a standard VMware platform; additional lightweight connectors 400 can be created in less than 5 seconds to handle additional application instances. By not accepting inbound connections, the lightweight connectors 400 make the file shares and applications 402, 404 "dark," removing a significant threat vector.

The policy can be established and pushed by policy engines in the central authority 152, such as via a distributed cluster of multi-tenant policy engines that provide a single interface for all policy creation. Also, no data of any kind transits the policy engines. The nodes 150 in the security cloud stitch connections together, between the users 102 and the file shares and applications 402, 404, without processing traffic of any kind. When the user 102 requests an application in the file shares and applications 402, 404, the policy engine delivers connection information to the application 350 and app-side nodes 150, which includes the location of a single nodes 150 to provision the client/app connection. The connection is established through the nodes 150, and is encrypted with a combination of the customer's client and server-side certificates. While the nodes 150 provision the connection, they do not participate in the key exchange, nor do they have visibility into the traffic flows.

Advantageously, the virtual private access provides increased security in that the file shares and applications 402, 404 are visible only to the users 102 that are authorized to access them; unauthorized users are not able to even see them. Because application access is provisioned through the cloud-based system 100, rather than via a network connection, the virtual private access makes it impossible to route back to applications. The virtual private access is enabled using the application 350, without the need to launch or exit VPN clients. The application access just works in the background enabling application-specific access to individual contractors, business partners or other companies, i.e., the users 102.

The virtual private access provides capital expense (CAPEX) and operating expense (OPEX) reductions as there is no hardware to deploy, configure, or maintain. Legacy VPNs can be phased out. Internal IT can be devoted to enabling business strategy, rather than maintaining network "plumbing." Enterprises can move apps to the cloud on their schedule, without the need to re-architect, set up site-to-site VPNs or deliver a substandard user experience.

The virtual private access provides easy deployment, i.e., put lightweight connectors 400 in front of the file shares and applications 402, 404, wherever they are. The virtual private access will automatically route to the location that delivers the best performance. Wildcard app deployment will discover applications upon request, regardless of their location, then build granular user access policies around them. There is no need for complex firewall rules, Network Address Translation issues or policy juggling to deliver application access. Further, the virtual private access provides seamless integration with existing Single Sign-On (SSO) infrastructure.

Figure 10:
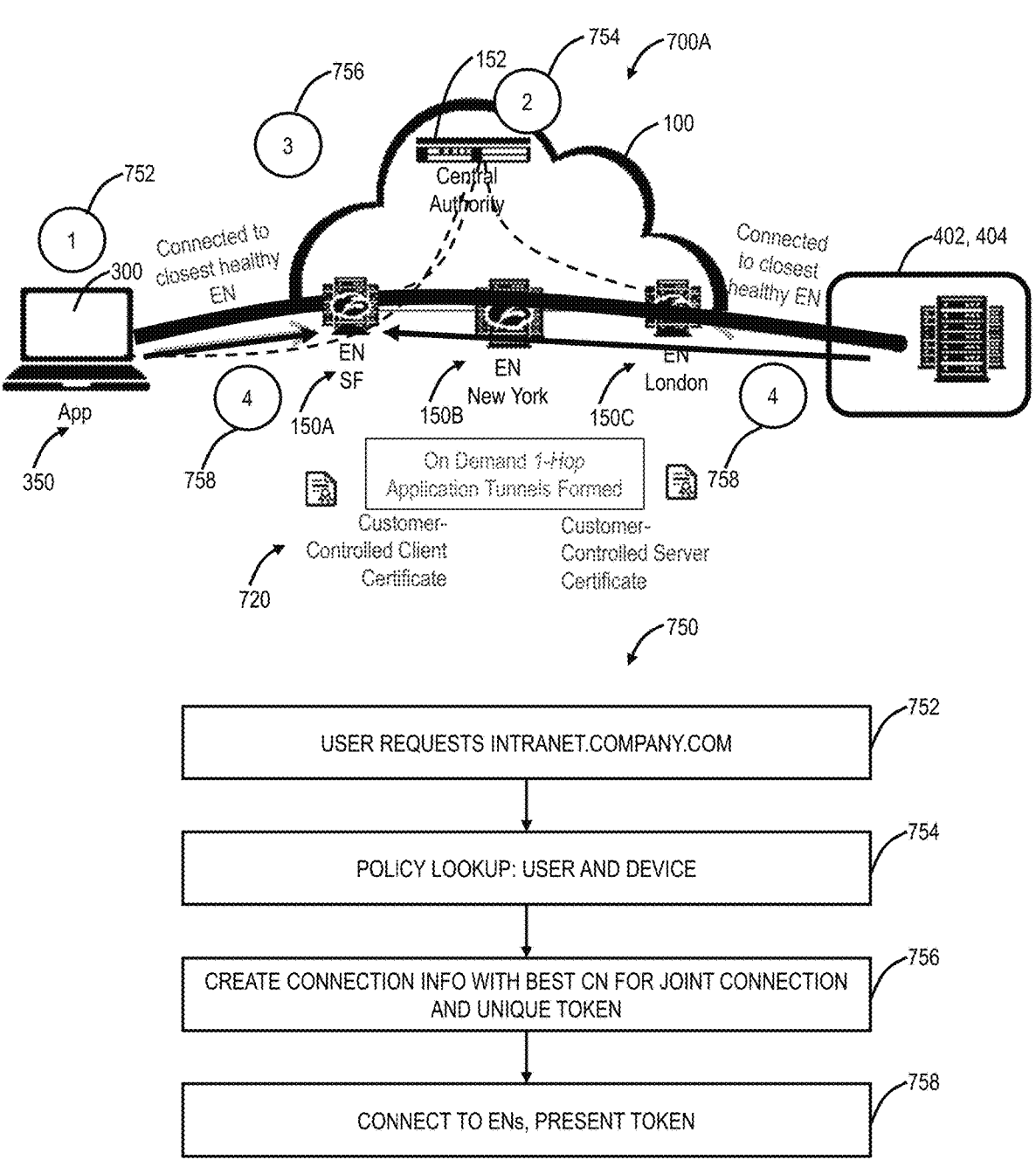
FIG. 10 is a network diagram of a virtual private access network and a flowchart of a virtual private access process implemented thereon.

FIG. 10 is a network diagram of a virtual private access network 700A and a flowchart of a virtual private access process 750 implemented thereon. The cloud-based system 100 includes three nodes 150A, 150B, 150C, assume for illustration purposes in San Francisco, New York, and London, respectively. The user 102 has the application 350 executing on the user device 300, which is communicatively coupled to the node 150A. The enterprise file share and application 402, 404 is communicatively coupled to the node 150C. Note, there can be direct connectivity between the nodes 150A, 150C, the nodes 150A, 150C can connect through the node 150B, or both the user 102 and the enterprise file share and application 402, 404 can be connected to the same node 150. That is, the architecture of the cloud-based system 100 can include various implementations.

The virtual private access process 750 is described with reference to both the user 102, the cloud-based system 100, and the enterprise file share and application 402, 404. First, the user 102 is executing the application 350 on the user device 300, in the background. The user 102 launches the application 350 and can be redirected to an enterprise ID provider or the like to sign on, i.e., a single sign on, without setting up new accounts. Once authenticated, Public Key Infrastructure (PKI) certificate 720 enrollment occurs, between the user 102 and the node 150A. With the application 350 executing on the user device, the user 102 makes a request to the enterprise file share and application 402, 404, e.g., intranet.company.com, crm.company.com, etc. (step 752). Note, the request is not limited to web applications and can include anything such as a remote desktop or anything handling any static Transmission Control Protocol (TCP) or User Datagram Protocol (UDP) applications.

This request is intercepted by the node 150A and redirected to the central authority 152, which performs a policy lookup for the user 102 and the user device 300 (step 754), transparent to the user 102. The central authority 152 determines if the user 102 and the user device 300 are authorized for the enterprise file share and application 402, 404. Once authorization is determined, the central authority 152 provides information to the nodes 150A, 150B, 150C, the application 350, and the lightweight connectors 400 at the enterprise file share and application 402, 404, and the information can include the certificates 720 and other details necessary to stitch secure connections between the various devices. Specifically, the central authority 152 can create connection information with the best nodes 150 for joint connections, from the user 102 to the enterprise file share and application 402, 404, and the unique tokens (step 756). With the connection information, the node 150A connects to the user 102, presenting a token, and the node 150C connects to the lightweight connector 400, presenting a token (step 758). Now, a connection is stitched between the user 102 to the enterprise file share and application 402, 404, through the application 350, the nodes 150A, 150B, 150C, and the lightweight connector 400.

Comparison—VPN with Virtual Private Access

Figures 11, 12:
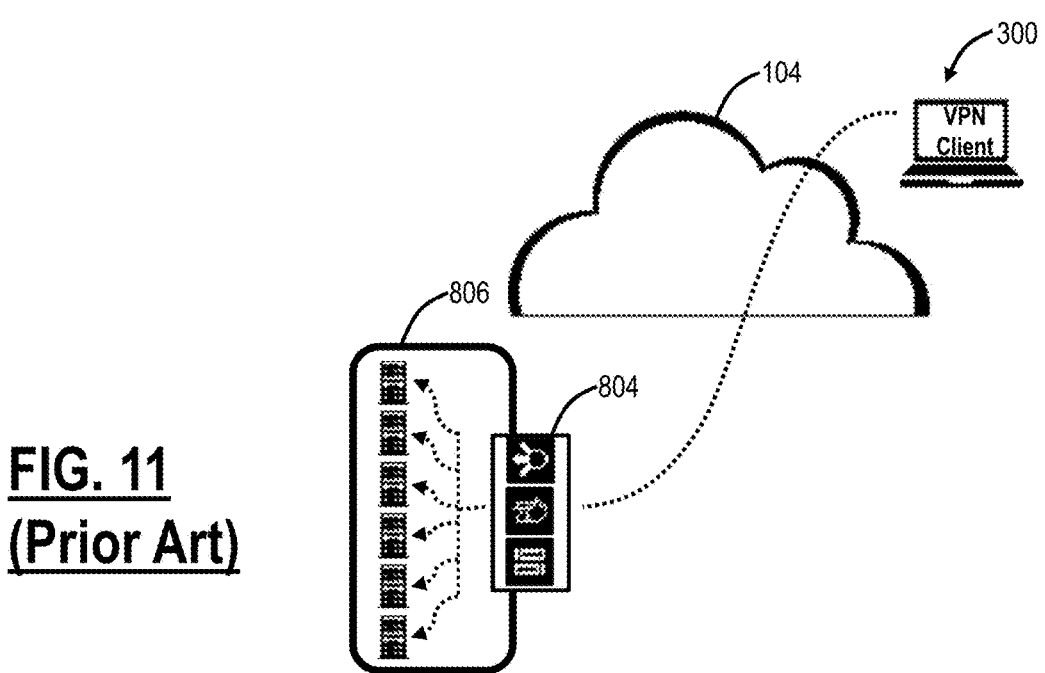
FIGS. 11 and 12 are network diagrams of a VPN configuration (FIG. 11) compared to virtual private access (FIG. 12) illustrating the differences therein.

FIGS. 11 and 12 are network diagrams of a VPN configuration (FIG. 11) compared to virtual private access (FIG. 12) illustrating the differences therein. In FIG. 11, a user device 300 connects to a VPN termination device 804 associated with an enterprise network 806 via the Internet 104, such that the user device 300 is on the enterprise network 806, where associated applications reside. Of course, any malware on the user device 300 or anyone that steals the user device 300 is also on the enterprise network 806. The VPN termination device 804 creates a Distributed Denial-of-Service (DDOS) attack surface, adds infrastructure cost and creates network complexity as applications grow. Conversely, in FIG. 12, the user device 300 uses the virtual private access via the cloud-based system 100 to connect to the lightweight connector 400 associated with a specific application 404. The virtual private access provides granular access by the user device 300 and the application, and the user device 300 is not on the enterprise network 806. Thus, the application is never directly exposed to the user device 300, the security cloud handles provisioning, and the traffic remains completely private.

Comparison—Private Applications in the Public Cloud

Figures 13, 14:
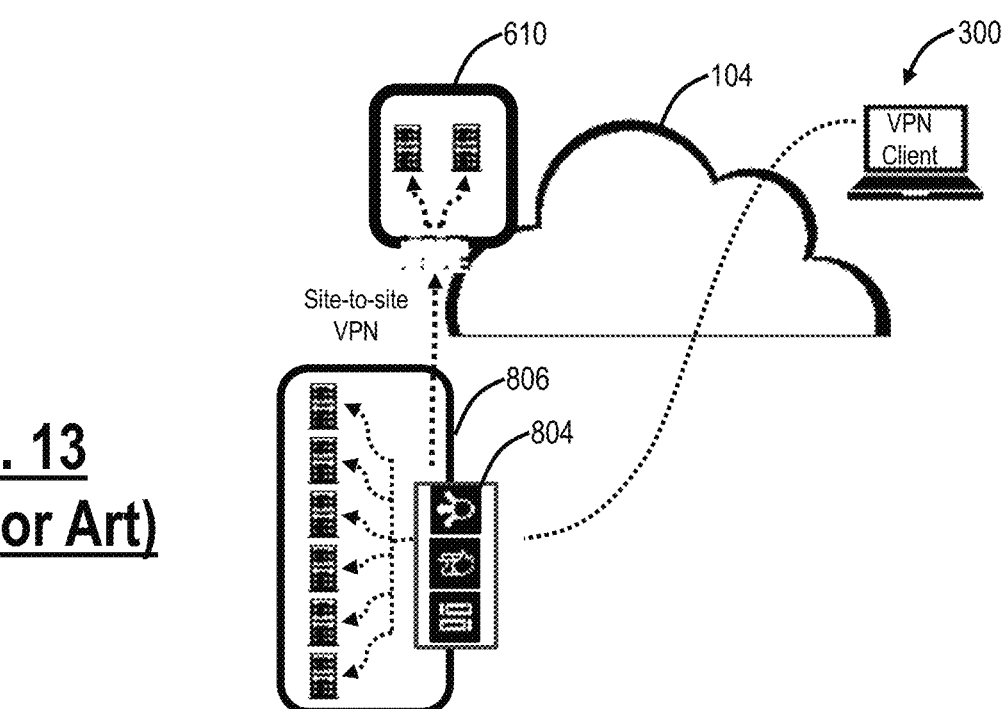
FIGS. 13 and 14 are network diagrams of conventional private application access in the public cloud (FIG. 13) compared to private applications in the public cloud with virtual private access (FIG. 14).

FIGS. 13 and 14 are network diagrams of conventional private application access in the public cloud (FIG. 13) compared to private application in the public cloud with virtual private access (FIG. 14). In FIG. 13, the user device 300 still has to connect to the enterprise network 806 via the VPN termination device 804 as in FIG. 11, and the cloud applications, such as in the data center 610, are accessible via the enterprise network 806 via a site-to-site VPN between the enterprise network 806 and the data center 610. Disadvantageously, the user experience is eroded for the user device 300 and agility is hampered for the enterprise by networking concerns and capability. In FIG. 14, the virtual private access abstracts the application 402, in the data center 610, from the IP address, so location is irrelevant. The enterprise can move private applications to the cloud securely, as needed.

Comparison—Contractor/Private Application Access

Figures 15, 16:
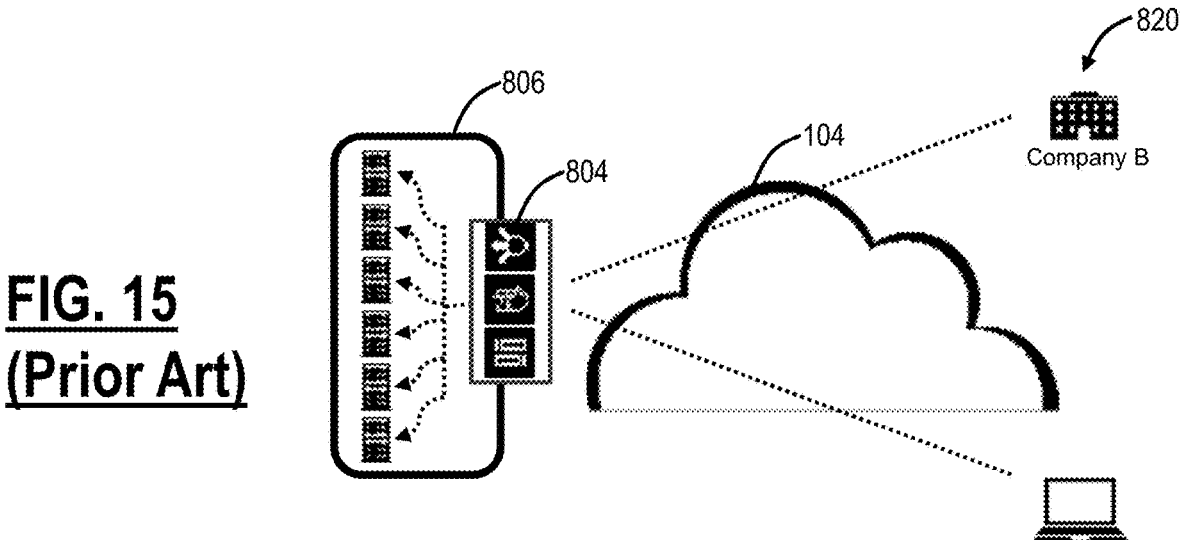
FIGS. 15 and 16 are network diagrams of conventional contractor/partner access (FIG. 15) of applications in the enterprise network compared to contractor/partner access (FIG. 16) of the applications with virtual private access.

FIGS. 15 and 16 are network diagrams of conventional contractor/partner access (FIG. 15) of applications in the enterprise network 806 compared to contractor/partner access (FIG. 16) of the applications with virtual private access. Contractor/partner access includes providing third parties access to applications on the enterprise network 806, for a variety of purposes. In FIG. 15, similar to FIGS. 11 and 13, contractor/partner access includes VPN connections to the VPN termination device 804, providing contractor/partners 820 full access to the enterprise network 806, not just the specific application or asset that they require. Unfortunately, stolen credentials can allow hackers to get into networks or to map assets for later assault. In FIG. 16, the virtual private access, using the cloud-based system 100, allows access specific to applications or assets as needed by the contractor/partners 820, via the lightweight connector 400. Thus, the contractor/partners 820 do not have full network access, the access is specific to each user, and the connections are provisioned dynamically, avoiding a direct network connection that can be misused or exploited.

Comparison—Example Application—M&A Data Access

Figures 17, 18:
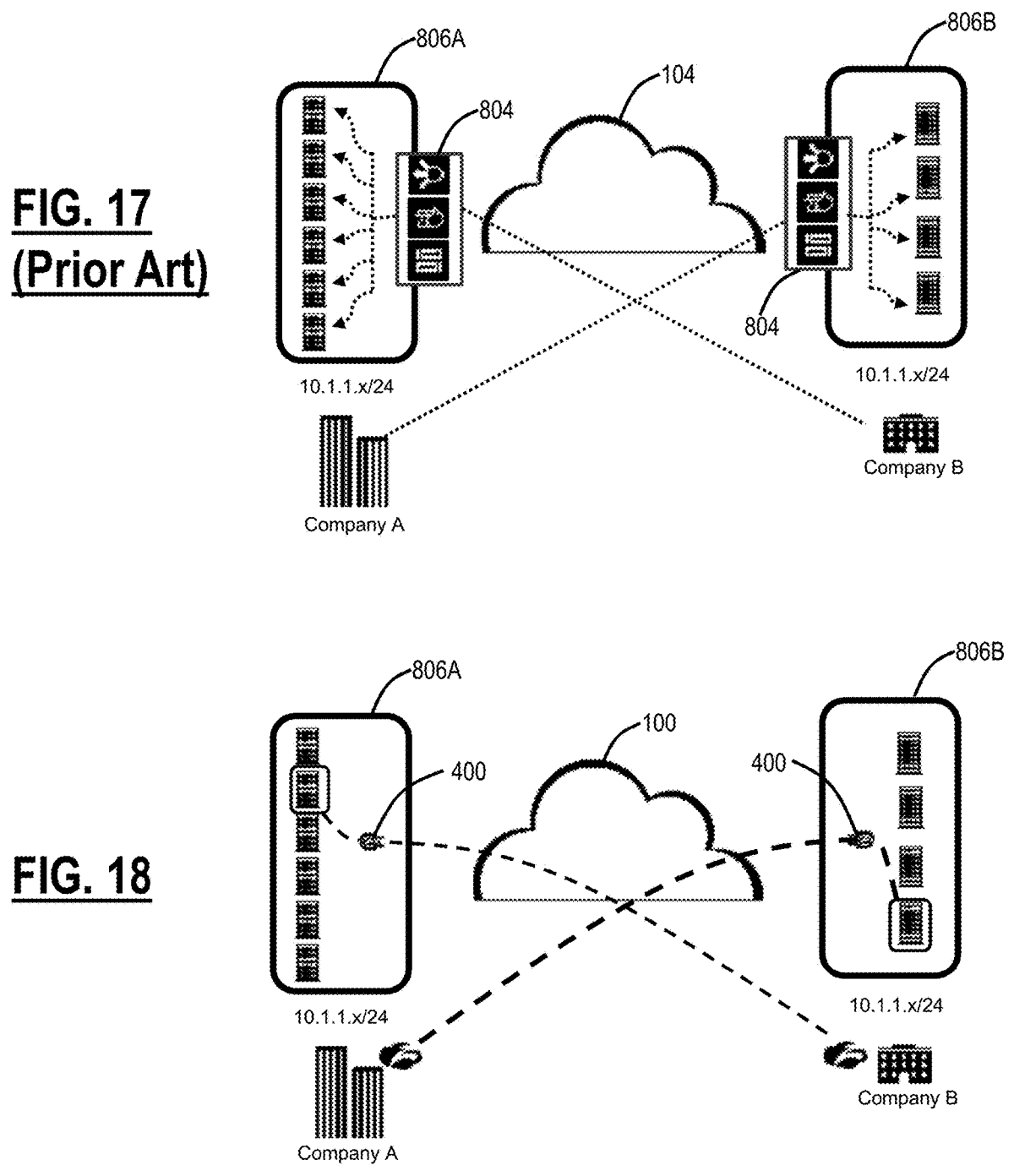

FIGS. 17 and 18 are network diagrams of a conventional network setup to share data between two companies (FIG. 17) such as for Merger and Acquisition (M&A) purposes or the like, compared to a network setup using virtual private access (FIG. 18). Conventionally, the two companies provide VPN connections between their associated enterprise networks 806A, 806B to one another. Each company gets "all or nothing"-no per-application granularity. Disadvantageously, creating Access Control Lists (ACLs)/firewall rules and NATting through each companies' respective firewalls is very complex, particularly with overlapping internal IP addressing. In FIG. 18, the virtual private access allows connections provisioned by the user and device to the application by name, not by IP address, authorized users can access only specific applications, not an entire network, and firewall complexities disappear.

Administrative View of Virtual Private Access

Figure 19:
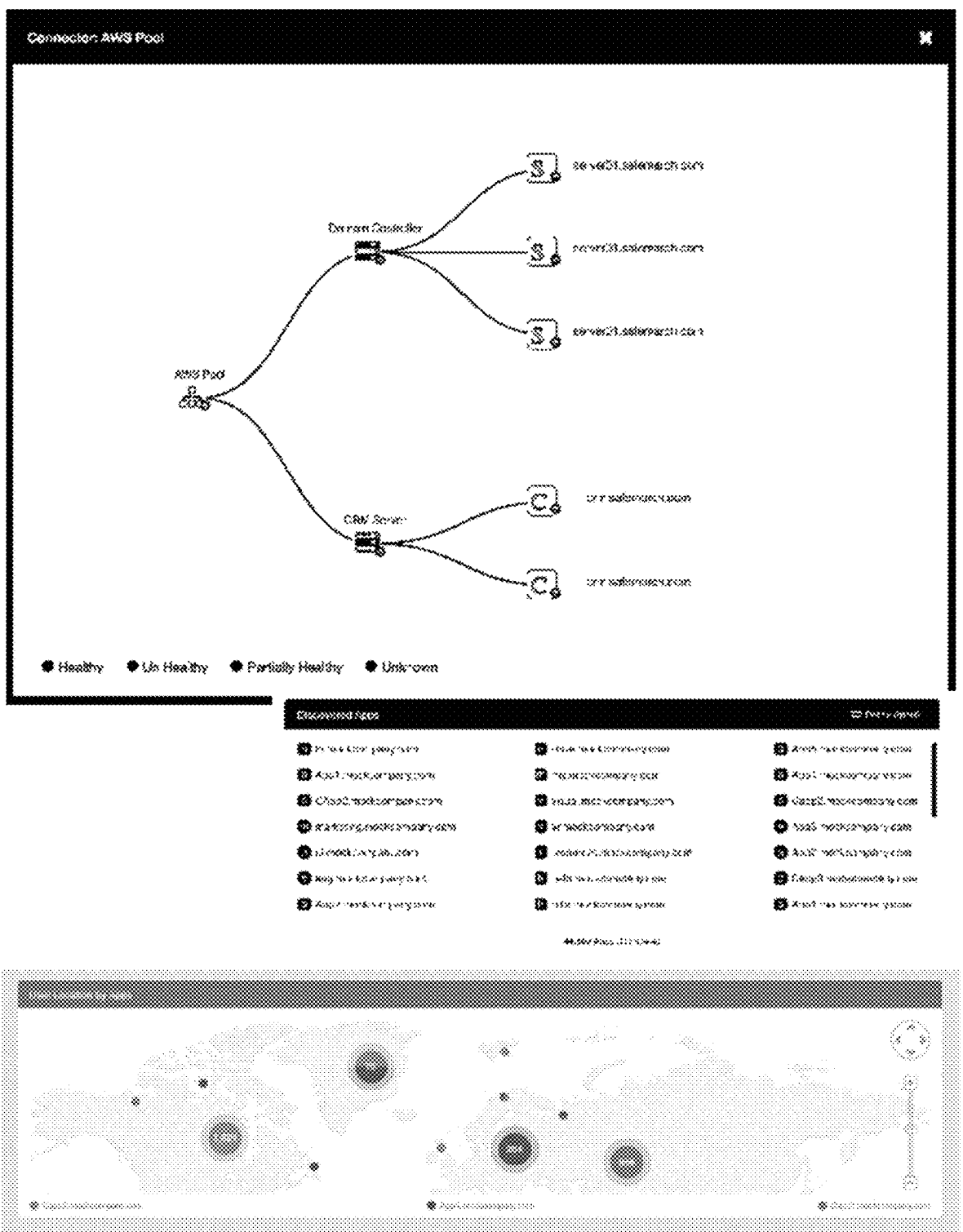
FIGS. 19 and 20 are screenshots of Graphical User Interfaces (GUIs) for administrator access to the virtual private access with FIG. 19 illustrating a GUI of network auto-discovery and FIG. 20 illustrating a GUI for reporting.
Figure 20:

FIGS. 19 and 20 are screenshots of Graphical User Interfaces (GUIs) for administrator access to the virtual private access. FIG. 19 illustrates a GUI of network auto-discovery and FIG. 20 illustrates a GUI for reporting. For network and application discovery, the virtual private access can use wildcard application discovery where a Domain/name-based query to the lightweight connector 400 will show company applications behind them. This allows the discovery of internal applications as users request them using "*. company.com" to find applications. Then, the granular policy can be built around the applications to dramatically simply startup. Further, the virtual private access can show the location of users that are accessing private/internal applications, including identifying anomalous access patterns to assist in stopping possible data leakage or compliance violation.

Virtual Private Access

In an embodiment, a virtual private access method implemented by a cloud-based system, includes receiving a request to access resources from a user device, wherein the resources are located in one of a public cloud and an enterprise network and the user device is remote therefrom on the Internet; forwarding the request to a central authority for a policy look up and for a determination of connection information to make an associated secure connection through the cloud-based system to the resources; receiving the connection information from the central authority responsive to an authorized policy look up; and creating secure tunnels between the user device and the resources based on the connection information. Prior to the receiving, a user executes an application on the user device, provides authentication, and provides the request with the application operating on the user device. The application can be configured to connect the user device to the cloud-based system, via an optimized cloud node based on a location of the user device. The resources can be communicatively coupled to a lightweight connector operating on a computer and communicatively coupled between the resources and the cloud-based system. The virtual private access method can further include detecting the resources based on a query to the lightweight connector. The lightweight connector can be prevented from accepting inbound connections, thereby preventing access of the resources external from the public cloud or the enterprise network. The creating secure tunnels can include creating connections between one or more cloud nodes in the cloud-based system, wherein the one or more cloud nodes do not participate in a key exchange, and the one or more cloud nodes do not have data access to traffic on the secure tunnels. The creating secure tunnels can include creating connections between one or more cloud nodes in the cloud-based system, wherein the one or more cloud nodes create the secure tunnels based on a combination of a client-side certificate and a server-side certificate. The secure tunnels can be created through software on the user device, the cloud-based system, and a lightweight connector operating on a computer associated with the resources, thereby eliminating dedicated hardware for virtual private network connections.

In another embodiment, a cloud-based system adapted to implement virtual private access includes one or more cloud nodes communicatively coupled to one another; wherein each of the one or more cloud nodes includes one or more processors and memory storing instructions that, when executed, cause the one or more processors to receive a request to access resources from a user device, wherein the resources are located in one of a public cloud and an enterprise network and the user device is remote therefrom on the Internet; forward the request to a central authority for a policy look up and for a determination of connection information to make an associated secure connection through the cloud-based system to the resources; receive the connection information from the central authority responsive to an authorized policy look up; and create secure tunnels between the user device and the resources based on the connection information. Prior to reception of the request, a user executes an application on the user device, provides authentication, and provides the request with the application operating on the user device. The application can be configured to connect the user device to the cloud-based system, via an optimized cloud node based on a location of the user device. The resources can be communicatively coupled to a lightweight connector operating on a computer and communicatively coupled between the resources and the cloud-based system. The memory storing instructions that, when executed, can further cause the one or more processors to detect the resources based on a query to the lightweight connector. The lightweight connector can be prevented from accepting inbound connections, thereby preventing access of the resources external from the public cloud or the enterprise network. The secure tunnels can be created through connections between one or more cloud nodes in the cloud-based system, wherein the one or more cloud nodes do not participate in a key exchange, and the one or more cloud nodes do not have data access to traffic on the secure tunnels. The secure tunnels can be created through connections between one or more cloud nodes in the cloud-based system, wherein the one or more cloud nodes create the secure tunnels based on a combination of a client-side certificate and a server-side certificate. The secure tunnels can be created through software on the user device, the cloud-based system, and a lightweight connector operating on a computer associated with the resources, thereby eliminating dedicated hardware for virtual private network connections.

Software stored in a non-transitory computer readable medium including instructions executable by a system, which in response to such execution causes the system to perform operations including receiving a request to access resources from a user device, wherein the resources are located in one of a public cloud and an enterprise network and the user device is remote therefrom on the Internet;

forwarding the request to a central authority for a policy look up and for a determination of connection information to make an associated secure connection through the cloud-based system to the resources; receiving the connection information from the central authority responsive to an authorized policy look up; and creating secure tunnels between the user device and the resources based on the connection information. The resources can be communicatively coupled to a lightweight connector operating on a computer and communicatively coupled between the resources and the cloud-based system, and wherein the instructions executable by the system, which in response to such execution can further cause the system to perform operations including detecting the resources based on a query to the lightweight connector.

VPN in the Cloud

In an embodiment, a method includes connecting to a client at a Virtual Private Network (VPN) device in a cloud-based system; forwarding requests from the client for the Internet or public clouds accordingly; and for requests for an enterprise associated with the client, contacting a topology controller to fetch a topology of the enterprise, causing a tunnel to be established from the enterprise to the VPN device, and forwarding the requests for the enterprise through the tunnel to the cloud-based system for proactive monitoring; and providing a secure connection from the cloud-based system back to the enterprise, including internal domain and subnets associated with the enterprise. The method can further include authenticating, via an authentication server, the client prior to the connecting and associated the client with the enterprise. The method can further include, subsequent to the connecting, setting a Domain Name Server (DNS) associated with the cloud-based system to provide DNS lookups for the client. The method can further include utilizing the DNS to determine a destination of the requests; and, for the requests for the enterprise, contacting the topology controller to pre-fetch the topology of the enterprise. The method can further include operating an on-premises redirection proxy within the enterprise, wherein the on-premises redirection proxy is configured to establish the tunnel from the enterprise to the VPN device. Secure tunnels to the enterprise are dialed out from the enterprise by the on-premises redirection proxy. The on-premises redirection proxy is a virtual machine operating behind a firewall associated with the enterprise. The on-premises redirection proxy is configured as a bridge between the client and applications inside the enterprise. The VPN device operates on a cloud node in the cloud-based system, and wherein the cloud-based system includes a distributed security cloud. The VPN device can include one of a software instance on a cloud node or a virtual machine on the cloud node. The topology controller includes a network topology of the enterprise, including internal domain names and subnets.

In another embodiment, a cloud-based system includes one or more Virtual Private Network (VPN) servers, wherein one or more clients connect securely to the one or more VPN servers; a topology controller communicatively coupled to the one or more VPN servers; a Domain Name Server (DNS) communicatively coupled to the topology controller and the one or more VPN servers; and a redirection proxy located in a private network and communicatively coupled to the one or more VPN servers and the topology controller; wherein requests from the one or more clients to the private network cause on demand secure connections being established by the redirection proxy to associated VPN servers in a cloud-based system, wherein the on demand secure connections provide connectivity to the private network including internal domain and subnets associated with the private network, and wherein the cloud-based system performs proactive monitoring. Requests from the one or more clients outside of the private network are forwarded without traversing the private network. The redirection proxy maintains a persistent connection to the topology controller and establishes secure tunnels to the one or more VPN servers based on direction from the topology controller. The topology controller includes a network topology of the private network, including internal domain names and subnets. The VPN servers operate on cloud nodes in a distributed security cloud.

In yet another embodiment, a VPN system includes a network interface, a data store, and a processor, each communicatively coupled together; and memory storing instructions that, when executed, cause the processor to establish a secure tunnel with a client; forward requests from the client to the Internet accordingly; and for requests to an enterprise, contact a topology controller to fetch a topology of the enterprise, cause a tunnel to be established from the enterprise to the VPN system, and forwarding the requests for the enterprise through the tunnel and the secure tunnel, wherein the secure tunnel is achieved by using an on-demand dial-out and tunneling traffic authentication. The memory storing instructions that, when executed, further cause the processor to cause the tunnel to be established from the enterprise to the VPN system through an on premises redirection proxy located within the enterprise.

Browser Isolation

Browser (web) isolation is a technique where a user's browser or apps are physically isolated away from the user device, the local network, etc. thereby removing the risks of malicious code, malware, cyberattacks, etc. This has been shown to be an effective technique for enterprises to reduce attacks. Techniques for browser isolation are described in commonly-assigned U.S. patent application Ser. No. 16/702,889, filed Dec. 4, 2019, and entitled "Cloud-based web content processing system providing client threat isolation and data integrity," the contents of which are incorporated by reference herein. Traditionally browser isolation was focused on removing the risks of malicious code, malware, cyberattacks, etc. U.S. patent application Ser. No. 16/702,889 describes an additional use case of preventing data exfiltration. That is, because no data is delivered to the local system (e.g., to be processed by web content through the local web browser), none of the confidential or otherwise sensitive data can be retained on the local system.

The secure access can interoperate with browser isolation through the cloud-based system 100, to prevent data exfiltration, which is extremely critical as this is customer-facing data which adds to the sensitivity and liability, and also accessible to external users (customers). This functionality forces customers to interact with the B2B applications via an isolated, contained environment.

Private Service Edge in a Cloud-Based System

Figures 21, 22:
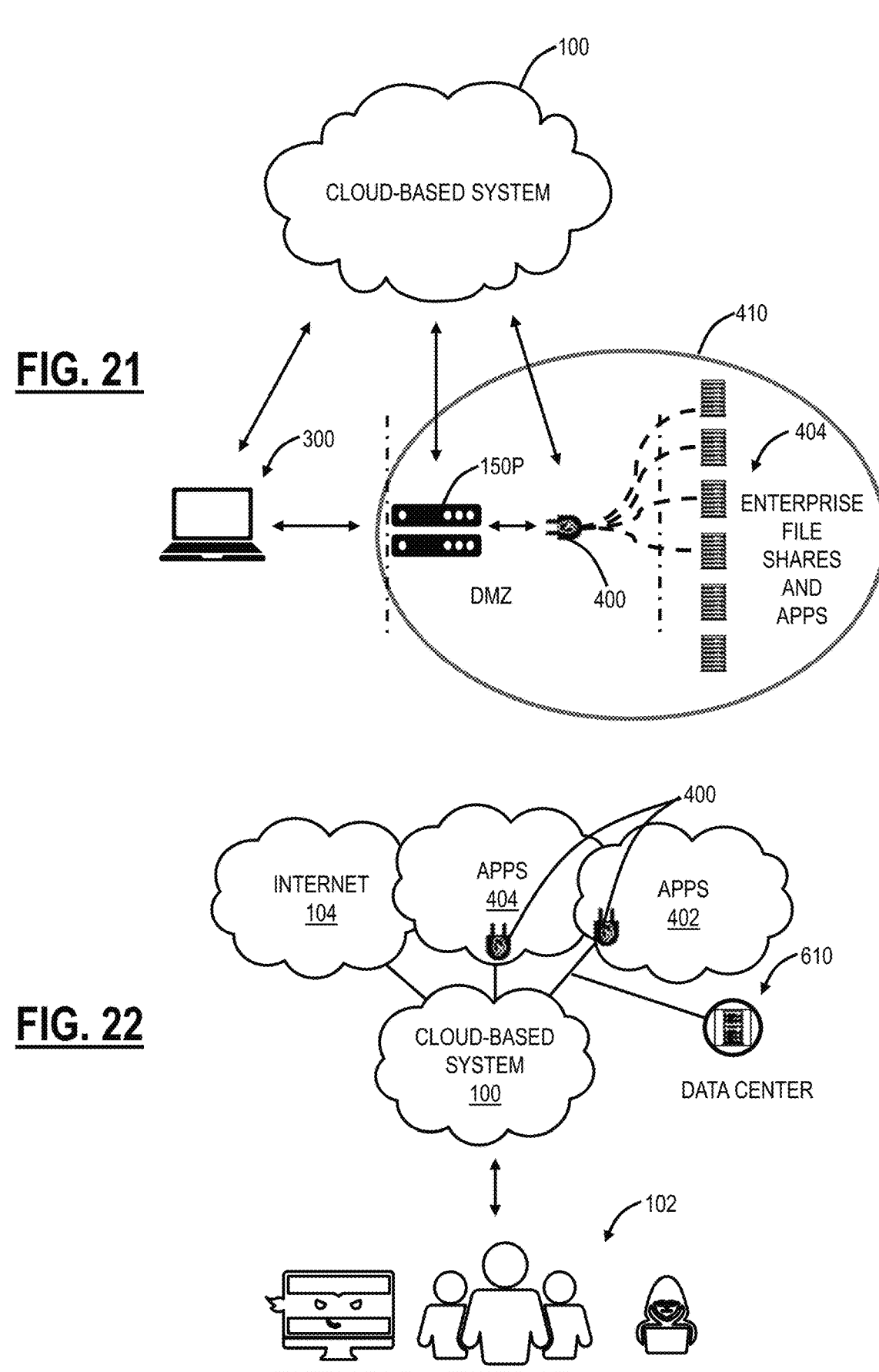
FIG. 21 is a network diagram of the cloud-based system with a private service edge node in an enterprise network.
FIG. 22 is a network diagram illustrating the cloud-based system with private applications and data centers connected thereto to provide virtual private access through the cloud-based system along with different types of users, namely trusted and untrusted users.

FIG. 21 is a network diagram of the cloud-based system 100 with a private service edge node 150P in the enterprise network 410. The private service edge node 150P is similar to the nodes 150 (i.e., public service edge nodes) except located in the enterprise network 410. For private application access, the service edge node 150P can be a per that is hosted by the enterprise, but managed with the cloud-based system 100. As described herein, a broker is configured to create the tunnels between the user device 300 and the connector 400, and the broker is an intermediate device. The service edge node 150P is designed as a single-tenant (per customer) instance, is configured to operate with the cloud-based system 100 including downloading policies and configuration, is configured to broker connections between the connector application 350 and the connector 400, is configured to enforce policies and cache path selection decisions, etc.

When a user 102 with the user device 300 is located on the enterprise network 410, the traffic between the user 102 and the applications 404 stay on the enterprise network 410 and consistent policies are applied for on-premise and remote. The private service edge node 150P can be located in a branch office, in a central office with tunnels to branch offices, etc. Of note, the private service edge node 150P is located with the applications 404 and the connector 400 and this proximity reduces latency.

The private service edge node 150P can be hosted in a public cloud, on-site as a Virtual Machine (VM), in a container, on physical servers, etc. The private service edge node 150P is publicly accessible such as via an IP address; the connector 400 is not publicly accessible—it dials out. The private service edge node 150P can include listen IP addresses and publish IP addresses or domains. The listen IP addresses are a set of IP addresses that the private service edge node 150P uses for accepting incoming connections, and this can be specified or all IP addresses. The publish IP addresses or domains, if specified, are required for connection to the private service edge node 150P. If these are specified, one of the entries is provided to the applications 350, e.g., randomly selected.

Private Access

FIG. 22 is a network diagram illustrating the cloud-based system 100 with private applications 402, 404 and data centers 610 connected thereto to provide virtual private access through the cloud-based system 100 along with different types of users 102, namely trusted and untrusted users. The ZTNA approach described herein provides virtual private access connecting authenticated users 102 to the applications 402, 404 after authorization and providing strong connection integrity with end-to-end encryption. However, tenants (organizations) do not implicitly trust the end user 102 or end user devices 300.

The following table illustrates example user 102 and user device 300 scenarios.

| User | Device | Trusted User | Trusted Device | Connection |
|------|--------|--------------|----------------|------------|
| Employee | Personal tablet | Y | N | Trusted user. Untrusted device. |
| Employee - on a notice period | Corporate laptop | N | Y | Untrusted user. Trusted device. |
| Third Party Contractors | Corporate laptop | N | Y | Third-party user. Trusted device. |
| Third Party Contractors | Non-corporate laptop | N | N | Third-party user. Untrusted device. |

With private application access, only an authenticated user can access the applications 402, 404; unauthenticated users see that the applications 402, 404 do not exist. However, an authenticated user can be an untrusted user or on an untrusted device. The security concerns with an untrusted user include access to sensitive information by query manipulation via web form; performing function elevation by URL manipulation; gaining access to internal resources via web server; etc. For example, an untrusted user can guess passwords of various accounts successfully, such as default/empty username and passwords (password spraying), stolen credentials for internal apps (credential stuffing), test default service accounts credentials, scripted login attempts (BOT), etc.

The security concerns with an untrusted device include the user's browser executes scripts and sends the user's cookie to the attacker's server, e.g., XSS, Cookie stealing; can case Denial of Service (DOS) on target application (not DDOS), e.g., user's browser initiates large number of connection requests to target application, scripted traffic overwhelms applications (BOT); and can copy of sensitive data on a non-corporate device.

Zero Trust Direction and Control

The present disclosure provides systems and methods for mechanisms to deliver zero trust protection and control to internet facing services, i.e., SaaS, IaaS, PaaS, Self or co-hosted, etc. in order to completely isolate and protect the destination service and content. By utilizing the present systems and methods, destinations are never exposed directly to the risks of the internet while protection of the destination service is implemented.

Internet hosted applications are inherently at risk of attack. Delivering an application to a target audience or set of customers requires making the application available in a shared network. Such shared networks allow any initiator 102 the ability to connect to the destination application, typically over a TCP/IP route path. The initiator typically has a source IP address and connects to a destination IP address. If the service is to be consumed by any initiator, for example, a web site, then the application must be exposed to the entirety of the internet. This exposure implies that any initiator 102 on the internet, including malicious actors, can connect to the destination application. This exposes the application to attack and can lead to expanding the enterprises attack surface. An initiator 102 can be any user utilizing a user device 300.

Traditional approaches to block and control these threats have been primarily an inline function. For example, traditional methods include network level controls, including access controls, load balancing, network level scrubbing, etc. These are traditionally delivered through network devices such as firewalls, routers, etc. Additionally, these methods have included application controls, including content inspection, content delivery, content scrubbing, etc. delivered through application gateway services such as application firewalls, cloud hosting services, reverse proxies, etc.

The implications of these traditional methods include that the initiator 102, either malicious or not, must still route traffic over the internet to a single or multiple destination services. These destination services and their protective services (network or application) are still vulnerable to the risk simply by being exposed. The simple rule for consideration is that the more open an application is required to be, the wider the exposure, and the larger the protection set that is required. There are 4 fundamental areas that historically have driven innovation in this area but are all still anchored on the implication of being Internet routable. These areas include DNS, routeable address, hosting services, and control services.

DNS allows initiators 102 to simply request destination services. In best case scenarios, the namespace for DNS will be owned by an enterprise, e.g. zscaler.com is owned by Zscaler. The enterprise can then delegate the responsibility to resolve various services to different name services, e.g. internal resolution (to RFC1918 IP spaces) is kept internal and managed by the enterprise. Whereas external resolution (internet routable) will be exposed to the Internet through a DNS service, either enterprise or third party managed.

routeable address focuses on delivering network path from initiator 102 to destination, where traditionally a shared network context (the Internet) was needed to deliver the service. This IP space is owned by the enterprise for their own locations, e.g. a data center, or it will be deleted through a cloud hosting provider, e.g. AWS or Azure. Should the application need to be externally connected, for anyone on the Internet, the IP address needs to be routable to anyone.

Hosting services are the location or service that hosts the destination application. For enterprises, there are often binary locations for application hosting. These locations can include on premises locations and the cloud. On premises locations include any location managed and operated by the enterprise, such as a data center. These sorts of locations often have segmentation based on security zone models that are implemented in division by function. Common designs are internet bound, demilitarized zone, and internal networks. On premises locations are often, but not always, deployed in models that keep the services close to the consumer base, e.g. geographically focused within an American location to serve American users. Enterprise managed services will need to provide various sets of interconnected services in order to deliver functions to the internet-connected-user-base. Such services include internet links, IP routing with the Internet, Border Gateway Protocol (BGP) peering, front end protection, load balancing, redundancy, etc. For cloud locations, cloud providers allow anyone to run an application and expose it to the Internet customer base without needing the enterprise to manage the interconnection services of internet links, peering, etc. Rather, enterprises pay for the use of the cloud provider services under a shared-service model.

The present systems and methods provide zero trust protected public internet resources such as websites and APIs. To deliver the present capabilities, functions are delivered in a number of areas that deliver the ability to simply implement zero trust protection of public workloads to enterprises. This provides enterprises the ability to deploy their public services securely without the risk of fear of breach.

As a zero trust implementation would outline, no service/workload is accessible until validating the access conditions of the session. Before validation, there is no access or even visibility to any service or workload, thus rendering it "hidden". Workloads will only ever have a context to their hosted service (Zscaler service).

Figure 23:
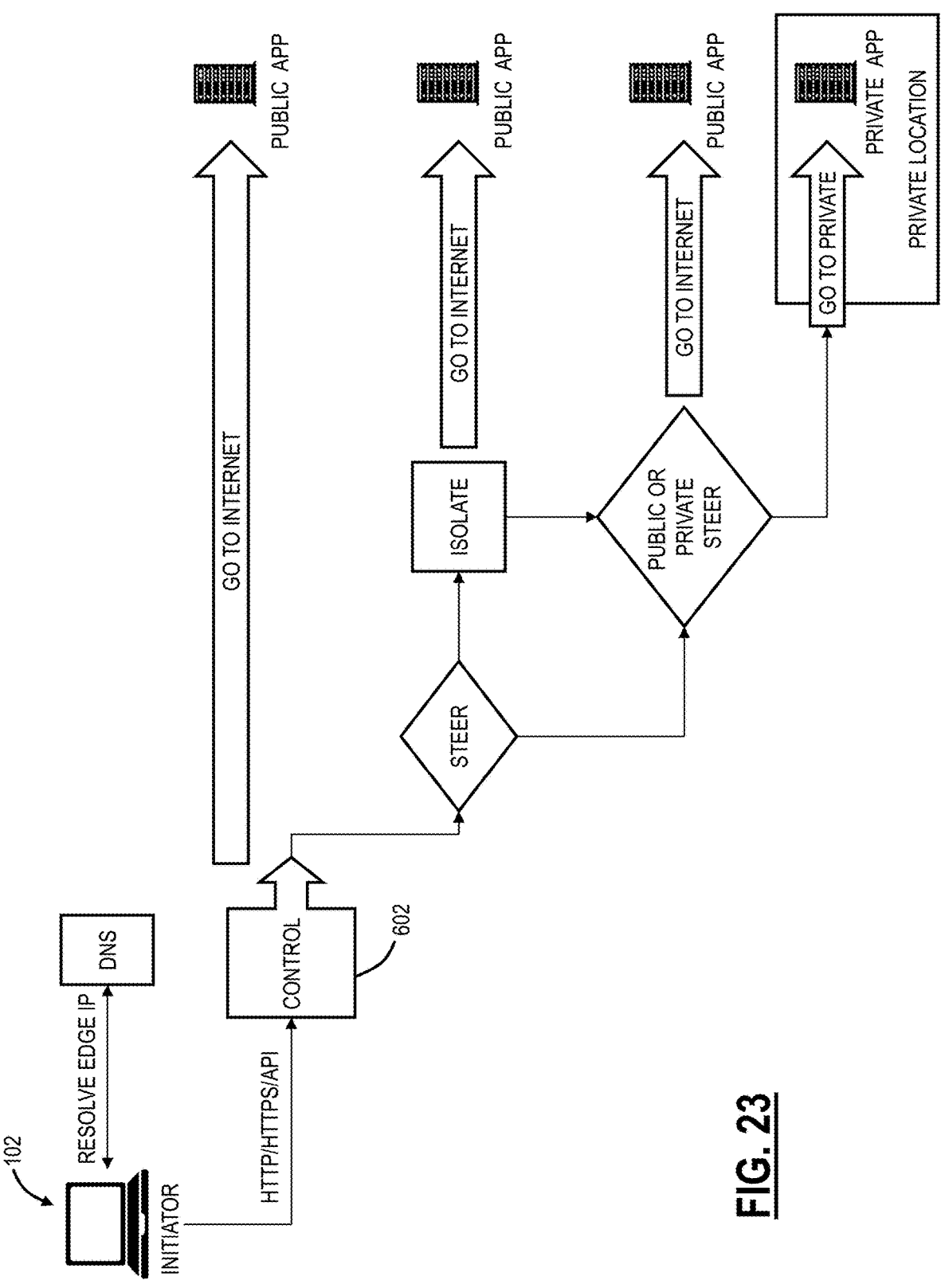
FIG. 23 is a flow diagram of the traffic flow of the present zero trust control from client to destination services.

FIG. 23 is a flow diagram of the traffic flow of the present zero trust control from client to destination services. Based on a customer allowing the cloud provider to have authoritative control over the resolution ability, i.e., allowing the cloud provider to be the "authoritative name server" of their domain, the cloud provider can control/change the answer/response to a request in order to direct the user requesting their domain to a control layer 602. Then, utilizing the security systems described herein, the systems can be decisive based upon the customers policy requests to either provide the controls, or forward through to the public application/destination. The controls can include, but are not limited to, steering, isolation, and sending to a private/hidden service (private access) so that the destination service is not exposed to the internet. In various embodiments, this process ensures that the destination IP address would never be exposed, and there would be no way of discovering it without authorization, thereby turning the public destination service completely private.

In various embodiments, the present systems and methods include 4 layers of services. These layers include verifying an identity of the destination service, getting traffic to the proper controls, applying and controlling policy, and implementing controls 60 and steering.

Figure 24:
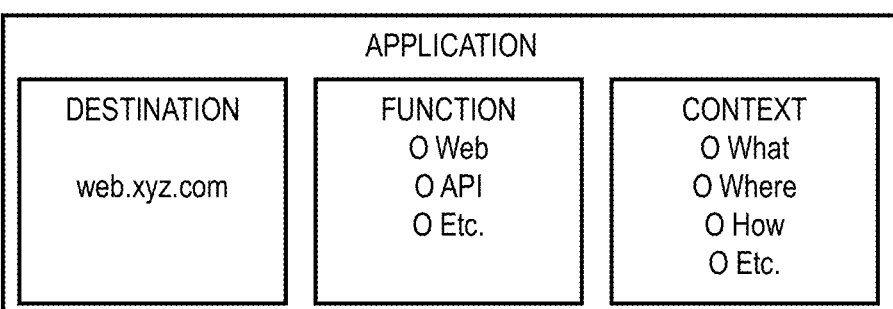
FIG. 24 is a screenshot of a Graphical User Interface (GUI) providing application definition option selections.

Verifying an identity of the destination service: The nature of public internet access means that anything can be an initiator 102. Thus, applying identity, initially to an initiator 102 of the session, in this implementation of zero trust is not possible. As such, identity and the rules related to control and access must be defined by the owner of the application that is protected behind the zero trust solution. FIG. 24 is a screenshot of a Graphical User Interface (GUI) providing application definition option selections. To define an appropriate identity to an application, the owner/customer will need to define, in the zero trust platform, the details of the destination application. This includes, but is not limited to destination, application function, and context. For the destination definition, the owner provides the fully qualified domain name of the destination application/service to be protected. For application functions, the owner defines a set of application types that can be protected, each function will apply various features to the identity definition. For example, a web service will have an identity that implies bi-directional traffic made up of various language content (client side, server side). Whereas an API would simply be a combination of standardized format (e.g. JSON) messages being pushed bidirectionally. The context provides additional details of the destination application that will help to define the specific identity, e.g. what is the app (corporation website, ecommerce, etc.), where it is hosted (cloud, local, private, etc.). Each additional value defined in the above application definition categories empower greater strength and variation to the identity of each application. At the conclusion of a destination service definition, the zero trust platform will have an identity value which can be used to apply connectivity and policy controls. Note, these values are subsequently consumed in the third layer for applying and controlling policy.

Figure 25:
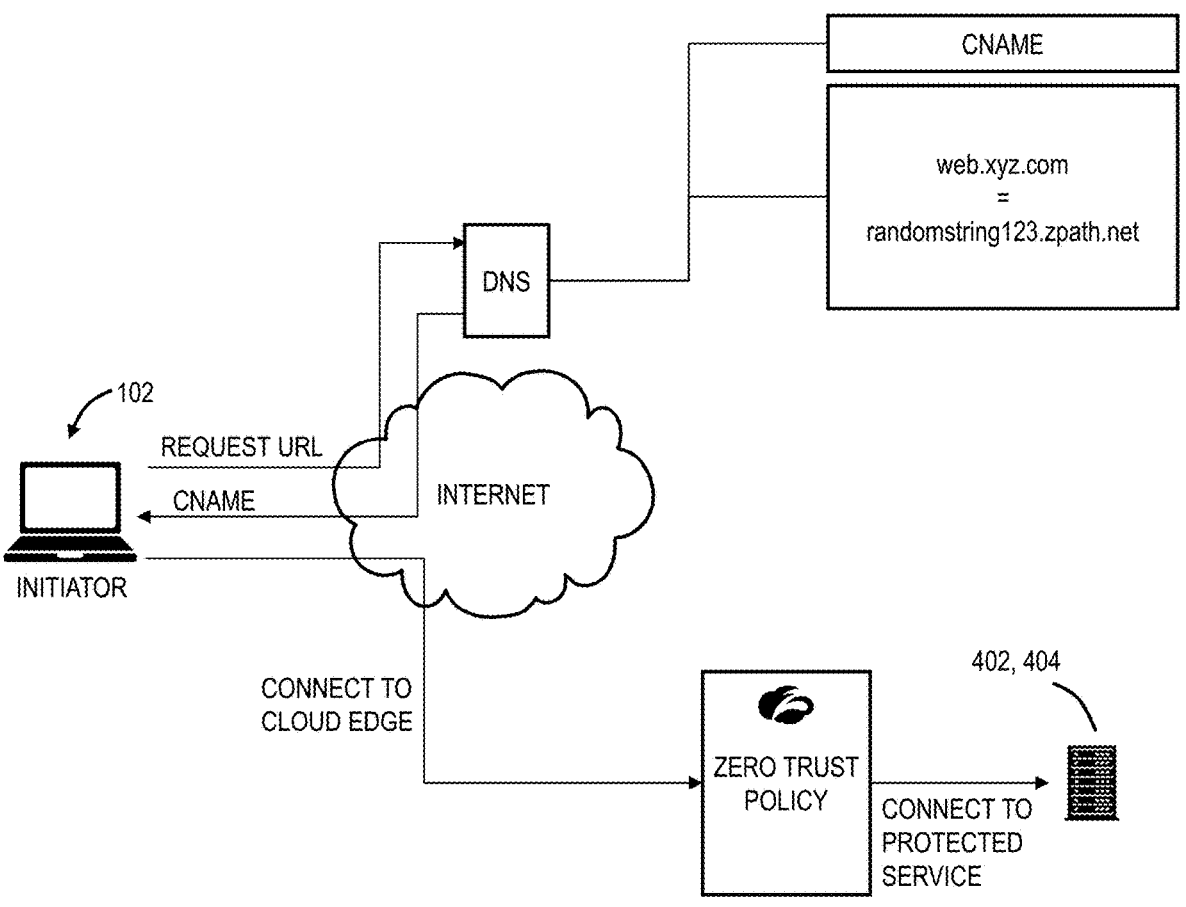
FIG. 25 is a flow diagram of how DNS Canonical Name (CNAME) resolution and client to edge forwarding is delivered.
Figure 26:
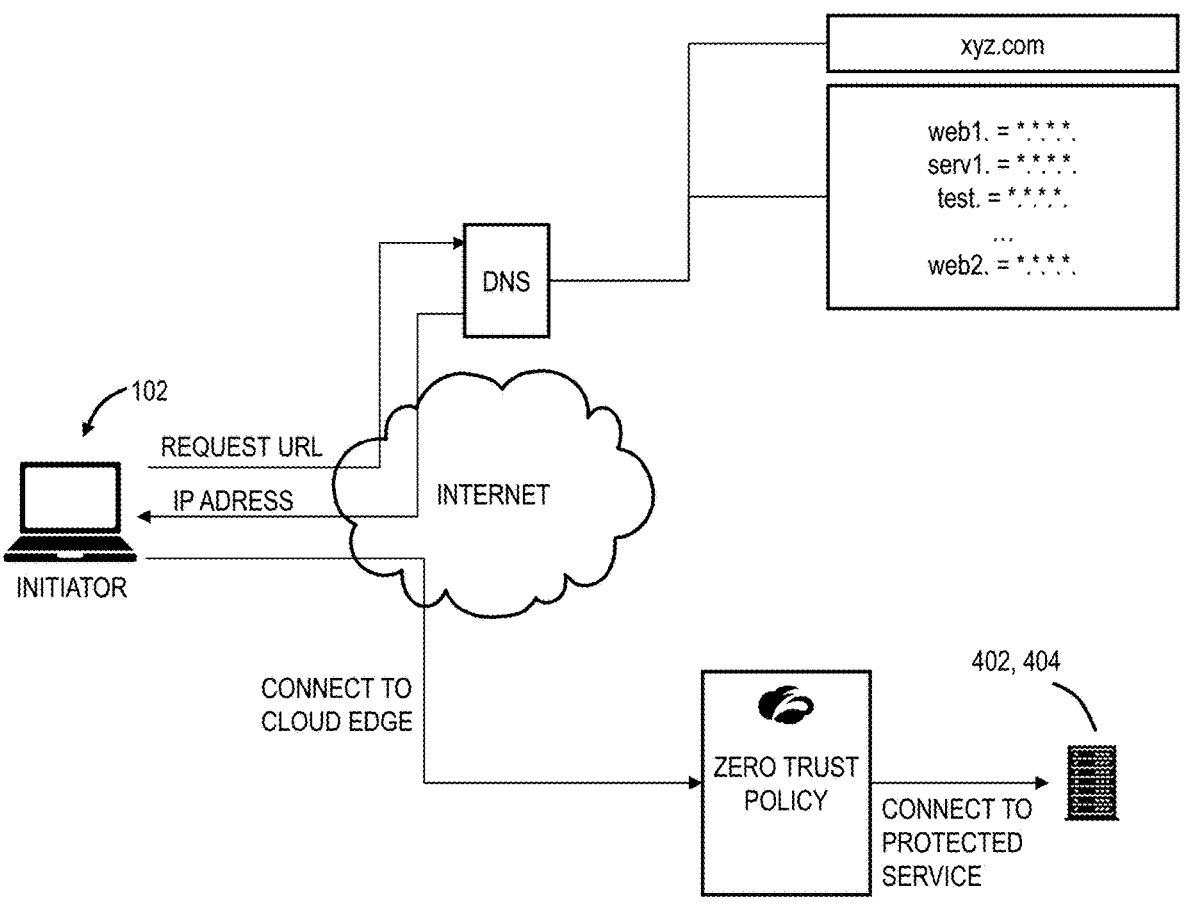
FIG. 26 is a flow diagram of authoritative DNS access from client and access to a destination application through a cloud edge.
Figure 27:
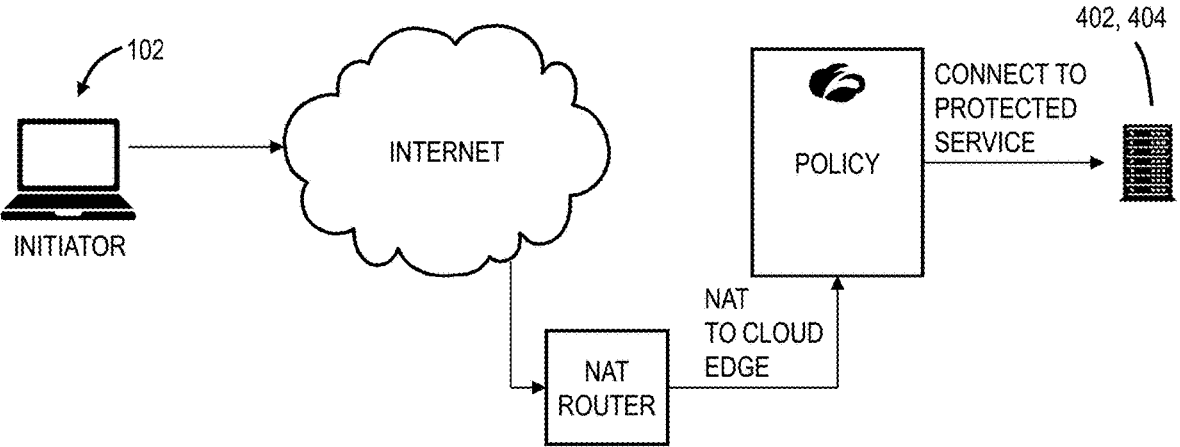
FIG. 27 is a flow diagram of delivery of network route access through a NAT of IPs to a cloud edge.

Getting traffic to the proper controls: In order to ensure that internet initiated traffic can reach the destination service, through the zero trust exchange, there must be an advertised mechanism for the internet hosted initiators 102 to send traffic. This requires instructing the internet clients to send traffic to the cloud provider edge. To deliver this instruction, there are 3 sub paths. These sub paths include DNS subdomain delegation, DNS authority delegation, and IP address path mapping/routing. FIG. 25 is a flow diagram of how DNS Canonical Name (CNAME) resolution and client to edge forwarding is delivered. Customers leverage their enterprise DNS system to create a CNAME record to have the internet facing domain (e.g., web.xyz.com) point to a cloud edge. For example, in reference to the applicant (Zscaler) of the present application, a Zscaler edge (e.g., randomstring123.zpath.net). This function allows for individual subdomains to be delegated to the cloud provider responsibility. FIG. 26 is a flow diagram of authoritative DNS access from client and access to a destination application through a cloud edge. For DNS authority delegation, customers allow the cloud provider (e.g., Zscaler) to become the full authoritative DNS resolver for all things related to the customer domain. This requires the cloud provider to have the DNS infrastructure to be an authoritative DNS service, but also the administration ability to allow customers control of DNS. This DNS resolution would, similar to the subdomain delegation, allow for enterprises to send traffic to the cloud edge. With the DNS authority, the cloud provider provides an "all in one" function of domain management. Finally, for IP address path mapping/routing, customers are given the ability to map which services will be directed to the cloud edge. FIG. 27 is a flow diagram of delivery of network route access through a NAT of IPs to a cloud edge. This is useful for services that are not able to resolve names or have hard coded IP addresses within their initiator functions. The present systems and methods provide a mechanism to steer traffic to the destination application behind the cloud protection function.

Based on any of the described paths above for delegating the cloud provider as an authority for the customers destination service, the systems then need to make a decision about how to create the connection from the user to the destination service. This decision is based on the defined policy received by the customer. For example, if the customer wishes to restrict access based on, for example, geographical regions, the systems will enforce the geographical control to requests to restrict access. This step is referred to as applying and controlling policy.

Figure 28:
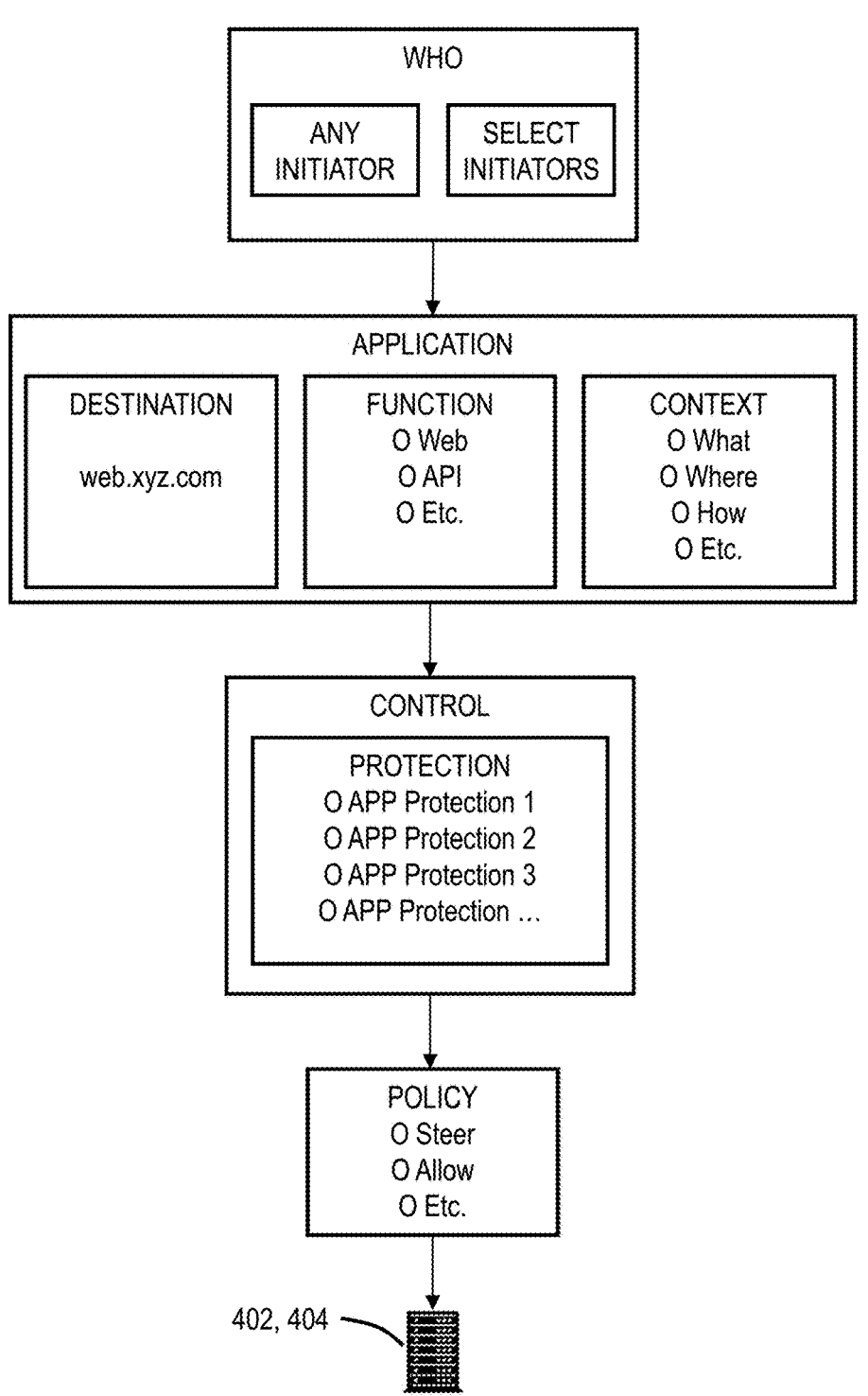
FIG. 28 is a flow diagram of a high level example of policy definition.

Applying and controlling policy: FIG. 28 is a flow diagram of a high level example of policy definition. Policy definition is the heart of zero trust for internet services. Via the present systems and methods, the appropriate controls can be defined for a destination service, for example, via a GUI provided by the present systems to a customer. Policy is used conditionally on a per access request basis, for example, based on which initiator 102 is connecting, to which application, how is that application going to be controlled, and the policy applied. The controls reflect the necessary protection required for each destination service. These controls can be applied to each destination in any necessary combination to deliver the required protection of the destination. These controls can include, but are not limited to:

A method to deliver dynamic and distributed zero trust name resolution.

A mechanism to protect the origin application from volumetric attacks where attackers attempt to overwhelm the service.

A mechanism to protect against Denial of Service (DOS) & Distributed Denials of Service (DDOS) attacks against service functions, such as attempting to input values into service at such magnitude that the service no longer responds.

A mechanism to protect the destination application from exposure to unwanted or non-approved connection requests.

A mechanism to allow definition of the type of application service and have intelligent controls applied.

A mechanism to automatically assess the destination application for necessary protection recommendations and identify the attack surface to protect.

A mechanism to inspect connections to destination services, ensuring all malicious attempts at access are restricted and not forwarded to the destination application.

A mechanism to limit what data can be downloaded from the destination application.

A mechanism to deliver the destination application to initiators 102 in an isolated, functional session.

A mechanism to send malicious traffic not to termination, but to a deceived destination.

The proposed systems and methods disclosed herein will enable any internet based entity (service) the ability to deploy zero trust based granular controls and protection. This can ensure that when that entity is enabled for consumption by internet users, the destination entity is protected and available. Leveraging least privileged controls means that workloads are not only accessed after approval, but also may exist in private isolated ecosystems such as private networks or other edge services. The present systems and methods provide existing and new customers with the ability to fully protect and maintain internet hosted services. Thus, the systems and methods enable customers to avoid multiple network and security configurations. The function is simply deployed to a customer by requesting the service through a provision portal, i.e., any customer of the cloud provider can enable and customize the protection described herein via a GUI.

The present systems and methods are provided to deliver a set of zero trust controls to protect public facing internet services, not just websites. That is, the public facing internet services (destination services) can be APIs, applications, websites, databases, etc. and could be anything that is exposed to the open internet. In various embodiments, the systems and methods describe a cloud provider which is adapted to act as an authority in the DNS space which allows the cloud provider to dictate where traffic is sent, i.e., send traffic via a control layer which is defined and customized by the customer.

The systems and methods allow customers to provide information relating to an internet service which they want to protect, and based on the provided information, the systems can create various sets of services for protecting the internet service, i.e., the systems can enable any of the cloud security systems to protect the customers' internet service. The information relating to the internet service can include DNS information, IP addressing information, and the like.

Figure 29:
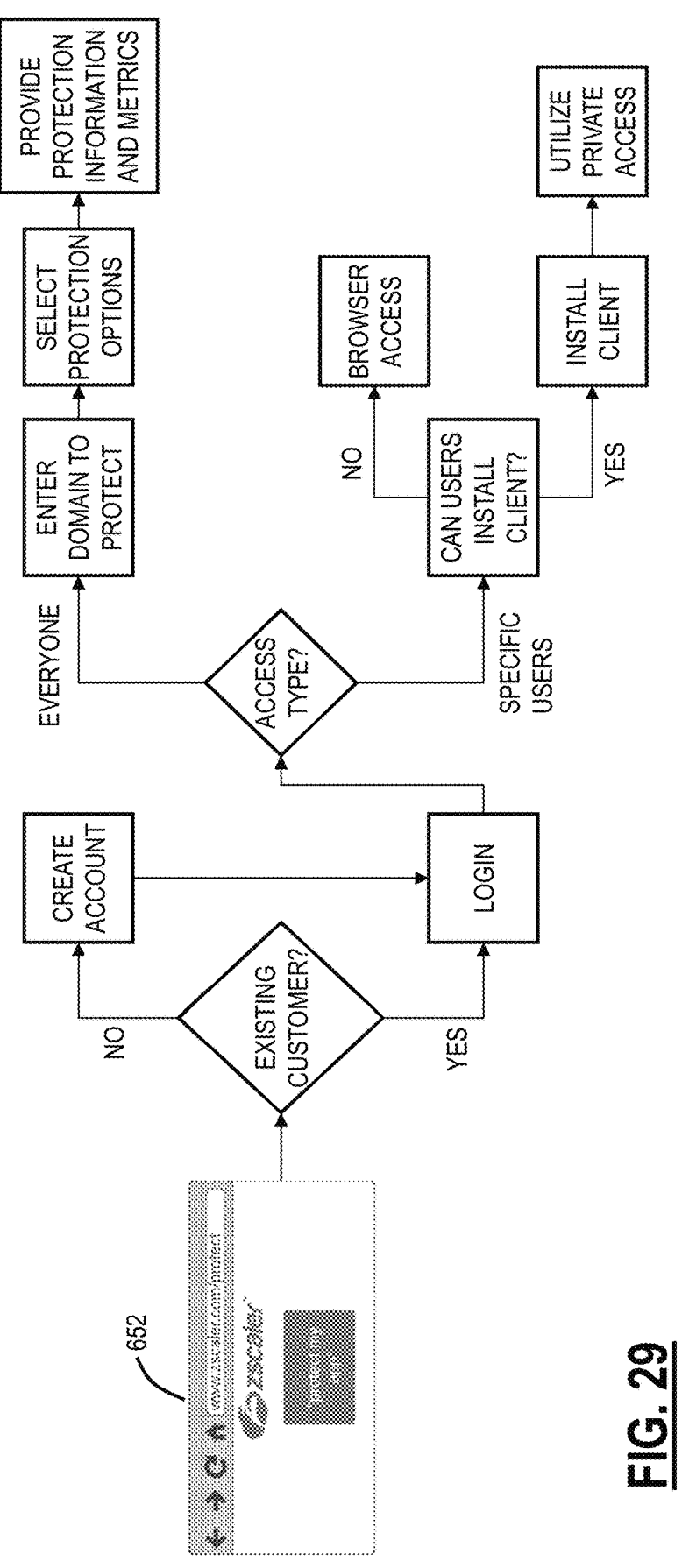
FIG. 29 is a flow diagram of the present zero trust control process from client to destination services.

FIG. 29 is a flow diagram of the present zero trust control process from client to destination services. Responsive to a customer allowing a cloud provider, in this case Zscaler, the applicant and assignee of the present application, to be the authority of their domain, the systems can change an answer that needs to be responded to a request, in terms of DNS, in order to direct a person requesting the domain to the cloud providers control infrastructure. Because the present systems and methods can function in combination with the various cloud security systems described herein, the systems then have the ability to provide additional layers of controls such as steering, isolation, sending the request to a private service or a hidden service, providing private access, and the like. This is performed so that the actual destination service is not exposed to the open internet without first going through the various controls (control layer). The present systems and methods, thereby, remove the ability for anyone to resolve and connect to the destination service and ensure that the cloud provider is a gateway and control layer for those destination services. That is, the systems and methods protect those destination services with various sets of controls based upon what the customer requires.

In an embodiment, shown in FIG. 29, via a front end portal 652, customers are provided an option to enable protection for their destination services. This front end portal can be provided to the customer via an application, such as the application 350, or a standalone protection application which can be accessed by customers of the cloud provider. Via the front end portal 652, customers can either login or create an account, if they are not existing customers, and login to configure their destination service protection. Once logged in, the customer can specify who will be accessing their destination service. Based on this selection, if only specific users/initiators are allowed to access the destination service, the systems can request a client connector, i.e., the connector application 350, to be installed on the users devices, and cause installation of the connector application 350 based thereon. If the users are able to install the connector application 350, then the systems can utilize the private access processes described herein to protect the customers destination service. That is, based on the connector application being able to be installed on the users device, the systems can utilize the processes for facilitating virtual private access utilizing the connector application 350, the nodes 150, and the lightweight connectors 400. The systems can utilize any of the embodiments of the virtual private access methods described herein in combination with the zero trust direction and control.

If the connector application 350 cannot be installed on the users devices, the systems can utilize browser access for connection to an application connector 400 for providing the private access for the customers destination service. If the client requests to allow anyone and everyone to access their destination service, i.e., the entire internet, the systems can request from the customer which domain they wish to protect. Again, the customer can set up any of the DNS resolution methods described herein to allow the cloud provider to control the routing of traffic to their destination. The customer is then provided with various protection options including, but not limited to, Web Application Firewalls (WAF), DNS, isolation, and steering. Once the protection is configured, the systems are adapted to enforce policies based on the customers configuration and provide protection metrics via a GUI.

In various embodiments, based on the customer requiring their destination service to be accessible by the entire internet, for example if the destination service is a website, the systems must make sure that they can control access to said destination service. That is, the systems need to have authority, in terms of DNS, for the destination service. For establishing this, the systems are adapted to give options to the customer to change their DNS provider or at least delegate the subdomain to be resolved by the present systems, i.e., the cloud provider/cloud-based system. On top of the various protection options, the systems can enforce egress policies for the customers domain based on customer configurations. Further, with steering enabled, the systems can either steer traffic into a public path or a private path, the public being the destinations resolvable IP address on the internet (e.g., the direct public path to the destination service), and the private path being via the private access systems described herein.

In various embodiments, the systems are further adapted to perform testing of the customers domain/domains. This testing can include testing visibility of the domain, determining if there are any records, testing for any attack surfaces, and the like. Based on the testing, the systems can add blocks to the domain based on these contextual insights. The systems can further look for and find any subdomains associated with the domain to protect. The systems can give the customer the option to protect these subdomains based on the findings.

Process for Zero Trust Direction and Control

Figure 30:
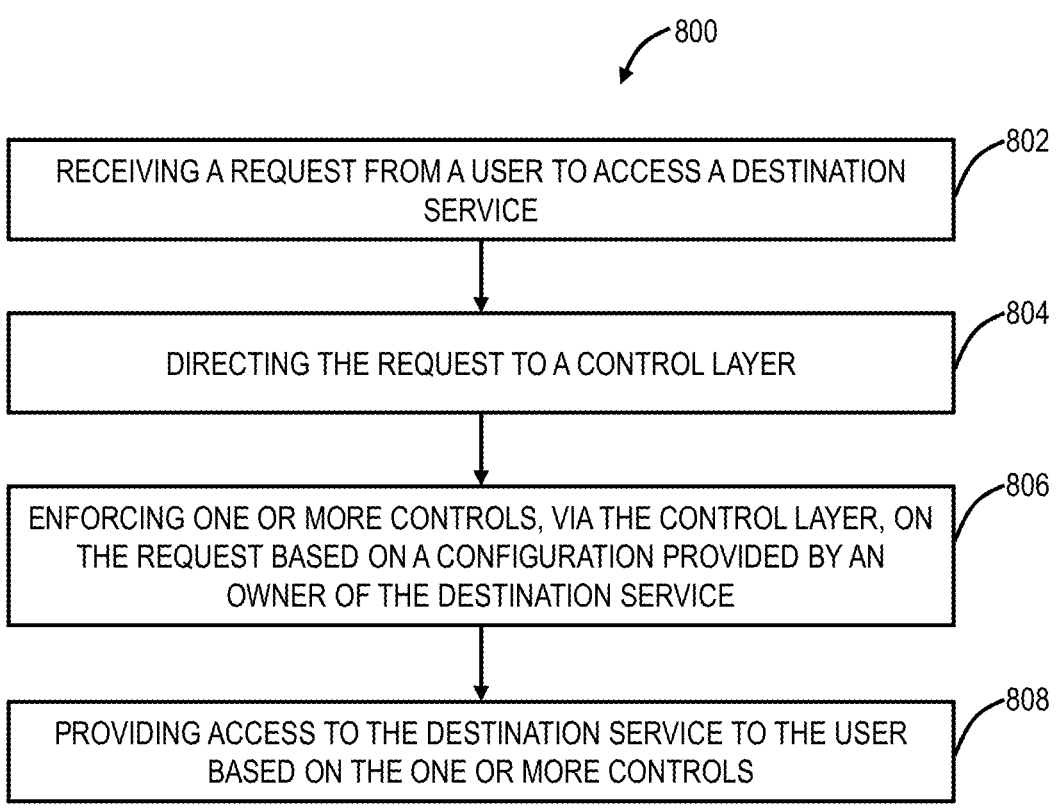
FIG. 30 is a flow chart of a process for zero trust direction and control.

FIG. 30 is a flow chart of a process 800 for zero trust direction and control. The process 800 includes receiving a request from a user to access a destination service (step 802); directing the request to a control layer (step 804); enforcing one or more controls, via the control layer, on the request based on a configuration provided by an owner of the destination service (step 806); and providing access to the destination service to the user based on the one or more controls (step 808).

The process 800 can further include wherein the destination service is associated with a domain, and the steps further include becoming an authority for a specific subdomain, or all subdomains associated with the domain; and directing requests to the specific subdomain or all subdomains based thereon. The destination service can be a public destination service. The directing can include one of directing the request to the control layer and directing the request directly to the public destination service based on the configuration. The providing access to the destination service to the user can include providing access to the destination service via a private access system. The steps can further include installing an application on a device associated with the user; and directing the request based thereon. The providing access can include stitching a connection between the user and the destination service through the application on the device associated with the user, one or more nodes of a cloud-based system, and a lightweight connector associated with the destination service. The steps can further include receiving the configuration from the owner, wherein the configuration defines one or more destination services requiring protection, and one or more policies; and based on the request being to one of the one or more destination services requiring protection, enforcing the one or more controls on the request based on the policies. The steps can further include identifying one or more subdomains associated with the domain; and enforcing the one or more controls on requests to the one or more subdomains. The destination service can be any of an Application Programing Interface (API), an application, a website, and a database.

Intelligent Application Definition and Protection

Internet facing applications can suffer direct attacks from being exposed to the internet. That is, such applications have an external "attack surface" that is wide, complicated, and by no means standard. A destination service may listen and operate on port 80 or 443, although, so do public APIs and any application a company may elect. As described herein, the present systems are adapted to ensure that internet based applications and other destination services are protected. In various embodiments, the systems can further identify exactly what it is to be protected.

In various embodiments of the present disclosure, the systems can include mechanisms to assess and determine a type and contents of an application that is submitted for protection, i.e., an application (destination service) provided by a customer for protection. By doing so, the systems can utilize the information collected from the assessment to propose optimized protection.

The systems can utilize/discover various information in the assessment including known content and unknown content/information associated with the application. Known content can include application specifications that can be inferred by the systems solely from the definition of the application, i.e., the information provided by the customer when onboarding a destination service which they wish to protect. When a customer wishes to utilize the present zero trust protection systems, the customer provides various information associated with the destination service which they wish to protect as described herein, this information is known as a destination service definition, i.e., the information provided by the customer as shown in FIG. 28. For example, the inferred information can include information about the application including but not limited to, identifying the function of the destination service as a web based Simple Object Access Protocol (SOAP) API, identifying that is uses TCP 443 or other port, etc. Again, this information can be inferred from the information provided by the application owner, i.e., the customer. Unknown content can include information that needs to be collected through either an assessment phase, run by the present systems, or manual interaction from the submitter. For example, but not limited to application profile assessment, e.g., what is the server type that runs the application (Apache, nginx, etc.), and what is the version of supporting software within that application.

This process can deliver visibility and specificity of the application when building policy for protection of that application. That is, by performing the application assessment, the systems can use any inferred and identified characteristics to recommend various policy options to the customer. These policy options and recommendations can then be displayed to the customer within the GUI used to configure the policy. Further, in various embodiments, based on the information determined from the assessment, the systems can automatically enforce policy to protect the destination service without requiring the customer to select policies. In various embodiments, the systems can go beyond simply assessing the application once, that is, rather than only assessing the application when it is onboarded and initially configured with policy, the systems can be adapted to profile the application constantly over time to deliver more optimized protection and provide policy recommendations based on this constant assessment/profiling. This constant/ongoing application assessment can occur based on specified time intervals, such as every hour, day, week, etc. These time intervals can either be configured by the customer, i.e., given as an option when onboarding a destination service, or set by the cloud provider. This includes identifying content and configuration changes, thus allowing policies to be recommended and adjusted based thereon. This also includes detecting changes that can impact the stability of the application. Further, such assessments can provide intelligence to feed data lakes, perform content assessment, determine CMBDs artificial intelligence locations, etc. This process removes most of the manual entry that would normally occur when building policies to protect a customers destination service.

Process for Intelligent Application Definition and Protection

FIG. 31 is a flow chart of a process 850 for intelligent application definition and protection. The process 850 includes receiving a destination service definition from a customer (step 852); performing an assessment of the destination service to determine one or more policies to use for the destination service (step 854); responsive to receiving a request from a user to access the destination service, directing the request to a control layer, and enforcing one or more controls on the request based on the one or more policies (step 856); and providing access to the destination service to the user based on the one or more controls (step 858).

The process 850 can further include providing one or more policy recommendations to the customer based on the assessment. The steps can further include performing ongoing assessments of the destination service at predefined intervals; identifying one or more changes associated with the destination service; and enforcing one or more controls on requests to the destination service based on the changes. The steps can further include providing one or more policy recommendations to the customer based on the changes. Determining the one or more policies to use for the destination service can be based on information associated with the destination service identified during the assessment, wherein the information includes known and unknown information. The destination service can be associated with a domain, wherein the steps further include becoming an authority for a specific subdomain, or all subdomains associated with the domain; and directing requests to the specific subdomain or all subdomains based thereon. The destination service can be a public destination service. The directing can include one of directing the request to the control layer and directing the request directly to the public destination service based on the configuration. The providing access can include stitching a connection between the user and the destination service through an application executing on a device associated with the user, one or more nodes of a cloud-based system, and a lightweight connector associated with the destination service. The destination service can be associated with a domain, wherein the steps further include identifying one or more subdomains associated with the domain; and enforcing the one or more controls on requests to the one or more subdomains.

Dynamic Distributed Name Resolution

In various embodiments, the present disclosure provides, in combination with the aforementioned processes, a set of mechanisms to deliver dynamic name to address resolution based on a centralized policy control. The resolution can dynamically vary based on the location of the initiating workloads and the location of the destination workload. Neither of which, the initiator 102 or destination, would share an inter-routable/internet routable network. This name resolution feature allows for initiators 102 and destinations to individually resolve an access path without ever sharing a network. This allows the destination resolution to shift dynamically.

Again, internet hosted applications are inherently at risk of attack. The exposed inbound network route and listener allows anyone on a shared network, i.e., the internet, the ability to discover and connect to the destination service. To discover the destination service, the initiating service must leverage the Domain Name Service (DNS) to translate the name of the destination service into the routable IP address. DNS is set to be a static resolution in that once the name is resolved, the IP address used for connection remains "in state" until a new request is made. This state based resolution leaves the connection in state from IP to IP connection and not renewable if terminated. This means that there is no way for the destination server, once it's IP has been confirmed, to switch IP connectivity without losing state.

Traditional methods to solve this challenge are all anchored within layers of network controls such as NAT, IP load balancing, etc. However, the state, even when transferred to an upstream gateway, still remains static for that session and exposed for attack as it must have an inbound listener.

Traditional name resolution and the subsequent connection initiation means that initiators 102 must resolve their request to a DNS resolver, route the resolution request via IP path to that DNS resolver, receive the resolved domain name, and subsequently connect to the resolved IP address for the system connection. The possibility of modifying the resolution of the domain can tell the initiating service to connect to an alternative IP address and path. Such a modification can include an alias CNAME. Regardless, once that resolution is made the connection will be based on the resolved Domain->IP address function. These resolution paths are traditionally broken into split DNS solutions in a hybrid design, so that different initiators would receive different responses.

As stated, the present systems and methods are adapted to deliver a distributed, dynamic authoritative name resolution service that ensures an enterprise is able to manage its domain, subdomain, and host level orchestration. This allows an enterprise to set which domain entities are resolved, to where they are resolved, and which initiators are allowed to resolve. At this point of resolution, the systems will not resolve the real IP address of the destination, rather the resolution will be to a controlled interface/control layer. The present systems are adapted to enforce the dynamic name to IP address resolution based on various characteristics of the request including characteristics of the initiator/user 102 and the destination in combination with policy. The characteristics can include the initiator, location of the initiator, network associated with the initiator, the type of resource being requested, and others of the like described herein.

Figure 32:
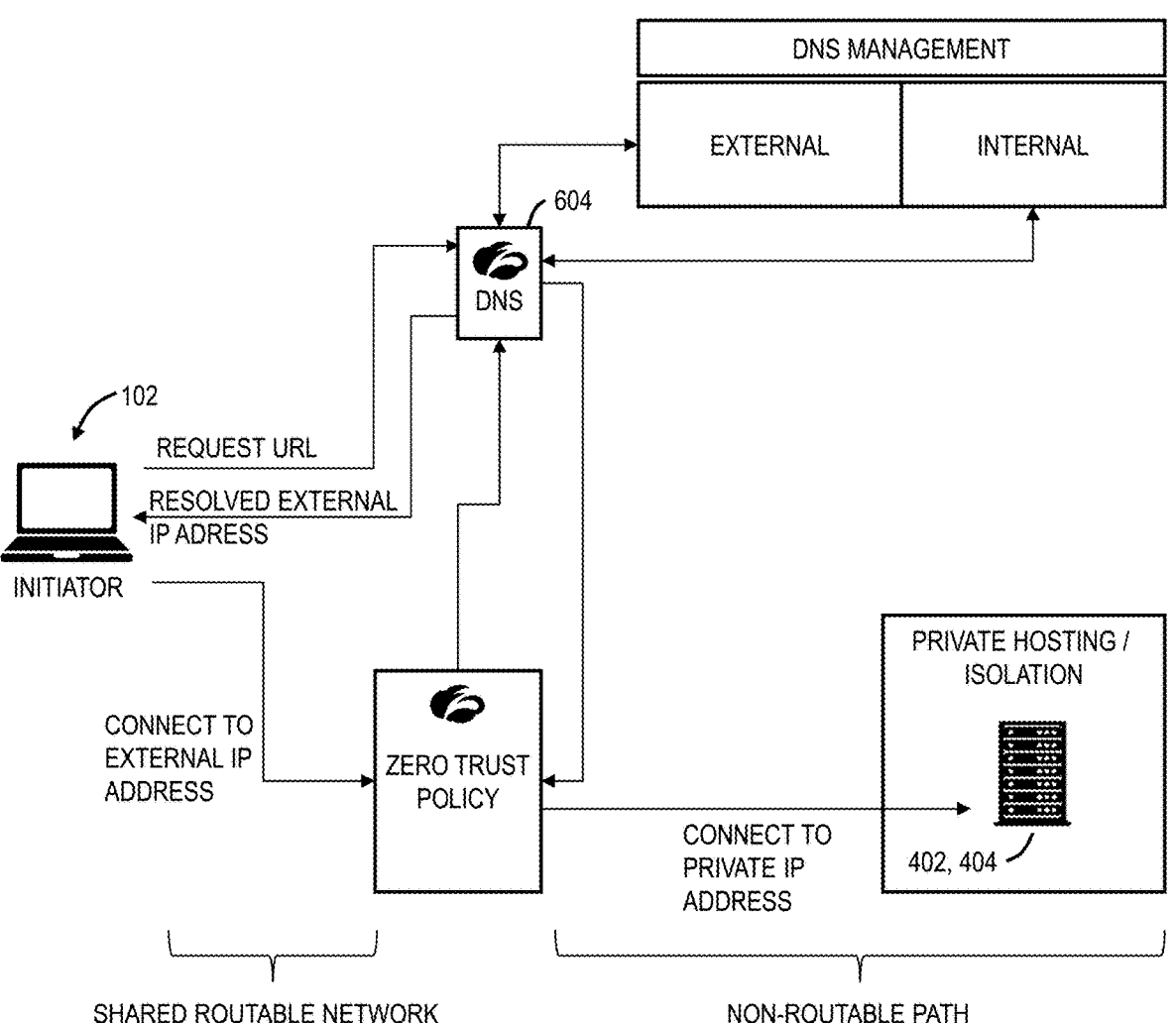
FIG. 32 is a flow diagram of a zero trust implemented DNS policy to split resolution dynamically.

FIG. 32 is a flow diagram of a zero trust implemented DNS policy to split resolution dynamically. In various embodiments, when an initiator 102 requests a domain, the DNS resolver 604 will respond with an external IP address for the destination. Again, based on the present disclosure, customers can give DNS authority to the cloud provider, allowing the cloud provider to control the DNS resolver 604. Subsequently, the request can be directed to the cloud edge and the cloud edge will enforce zero trust policy on the request including controls, conditional policy, connectivity path, etc. Based on this policy, the systems are adapted to resolve the destination's internal IP address and create a connection to the private destination service. Again, this private destination service can be access to the desired destination service through the virtual private access systems described herein. This granular approach to DNS authority, resolution, and administrative control delivers multiple sets of benefits. DNS resolution results will vary depending on not only which client is requesting, but also on what the policy and control enforcement will allow the initiator 102 to connect to.

Enterprise applications can be resolved dynamically to ensure that the authorized initiator 102 can most effectively connect to a destination service. This authority of name resolution removes the need for multiple DNS solutions across various enterprise locations, allowing enterprises to control how their applications are resolved through one system, with centralized authority. External domain authority control ensures that the context surrounding the initiating requestor receives the correct name resolution, depending on the details of that context.

Figure 33:
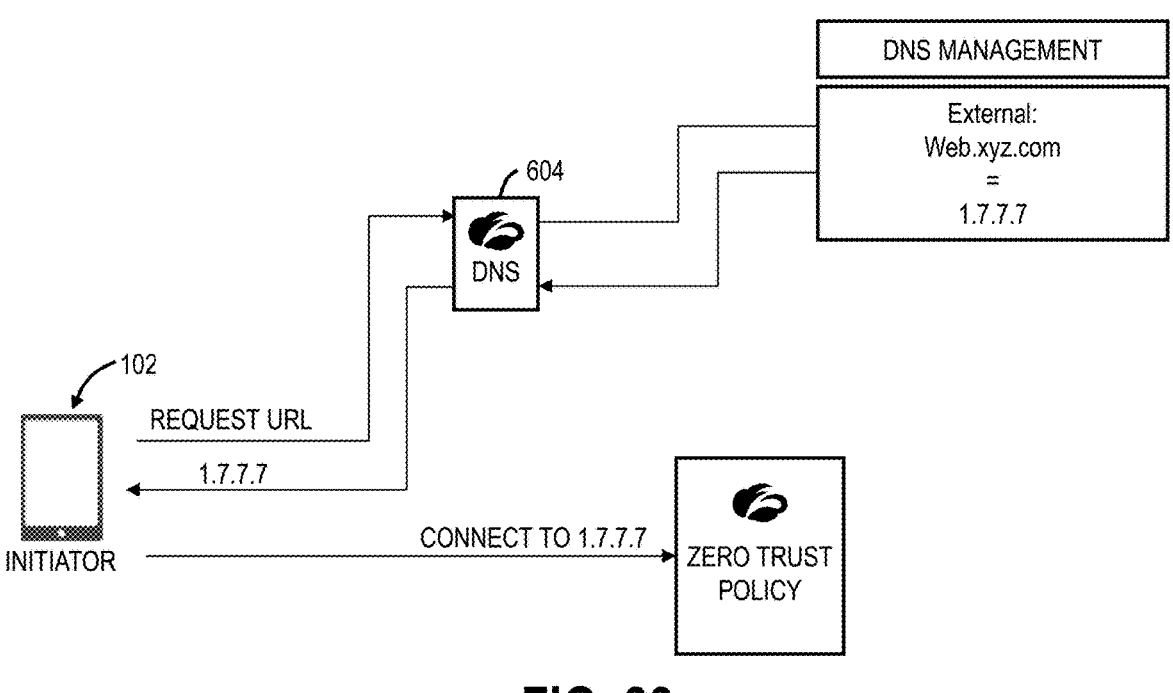
FIG. 33 is an example of the present systems performing DNS resolution for a mobile device on a cellular network.
Figure 34:
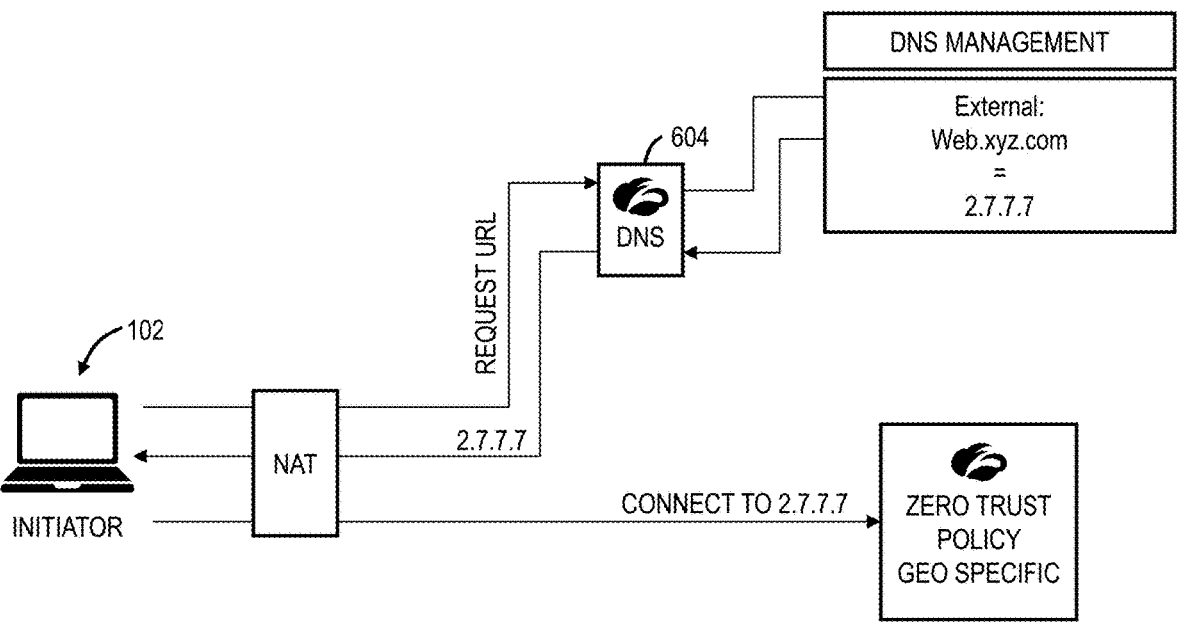
FIG. 34 is an example of the present systems performing DNS resolution for a desktop device on a NAT enabled network.

For example, an external mobile device would receive an optimized resolution for its conditions, i.e., it is connected to the destination service directly through the Internet. The systems are adapted to, based on the context such as the initiators device and network, resolve the IP address and create the connection. In contrast, a NAT protected workstation on a different network would receive a different resolution. For example, a desktop device, on a NAT enabled network will resolve an effective version of the application, different from the mobile device. Regardless, it will still observe the same domain name and path to the zero trust policy enforcement. These examples are shown in FIG. 33 and FIG. 34, wherein FIG. 33 is an example of the present systems performing DNS resolution for a mobile device on a cellular network, and FIG. 34 is an example of the present systems performing DNS resolution for a desktop device on a NAT enabled network. Again, the DNS resolver 604 is contemplated as, responsive to the customer giving the cloud provider authority over their DNS resolution, being controlled by the cloud provider. These examples demonstrate two iterations of contextual external resolution, both of which bring the initiator to the zero trust policy engine. Other indicators of context that can be considered include, but are not limited to, client side tunneling software, client credentials (e.g., single sign on, tokens, certificates, etc.), user authentication, geographic source, etc. These conditions allow for enterprises to deliver tailored resolution to each initiator, to then ensure optimized resolution and subsequent connectivity to an optimized path.

DNS resolution is built to ensure an initiator 102 can accurately resolve a name to an address and access the destination service. Again, this exposes the destination services IP address to anyone who requests the name resolution. The mechanism described herein for dynamic and distributed name resolution allows for complete protection of origin site IP discovery, in that the requestor will never see the destination service IP address, ASN, or location. This can be done because all resolution requests will be controlled by the dynamic name resolution policy, so that all resolution points to the zero trust policy controls. Thus, no identification of the origin server, IPs, or solutions are ever shared with the initiators device.

Figure 35:
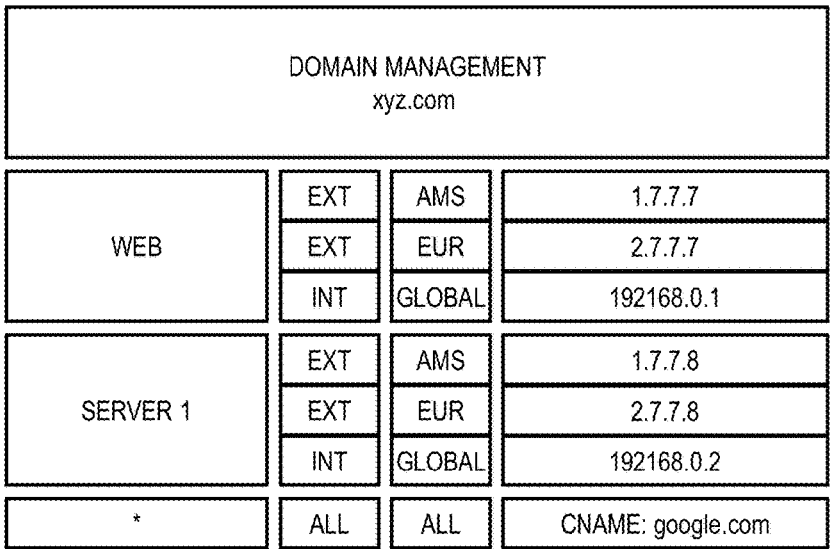
FIG. 35 is a diagram of domain management to sinkhole requests to a CNAME path.

In various embodiments, the present systems are further adapted to create and maintain an active inventory associated with domains. Authoritative DNS resolution for all values related to an enterprise domain are invaluable insights to an enterprise. These insights include identifying which requests are being made against a domain, and from whom these requests are being made, and from where. Taking this information into account, the dynamic and distributed name resolution can be configured to answer affirmatively to all requests, thus creating a DNS sinkhole at the request and requirement of an enterprise. FIG. 35 is a diagram of domain management to sinkhole requests to a CNAME path. In the example shown in FIG. 35, the domain management is adapted to sinkhole all requests (other than web and server 1) to a specified CNAME path, i.e., google-.com. in the example, EXT is external, INT is internal, AMS refers to request coming from the Americas, and EUR refers to request coming from Europe. That is, the domain management sends requests/responds based on the insight. This then negates the abilities of inquisitive types on the internet (or internally) to discover which names and services are active.

Figure 36:
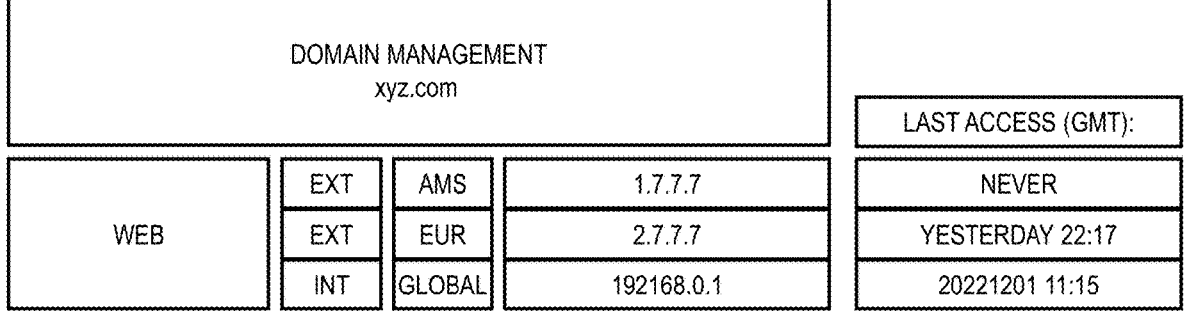
FIG. 36 is a diagram of identification and itemized inventory of used and unused domain names.

In addition, the dynamic and distributed name resolution allows enterprises to accurately identify exactly which of their assets are being requested, thus allowing for discovery. This can then be conversely used to maintain an accurate inventory of services and one that will drive a cleansing process or tech debt removal. FIG. 36 is a diagram of identification and itemized inventory of used and unused domain names. In various embodiments, the inventory includes information such as which domains have been accessed, from where, when, and if they were accessed internally or externally.

Figure 37:
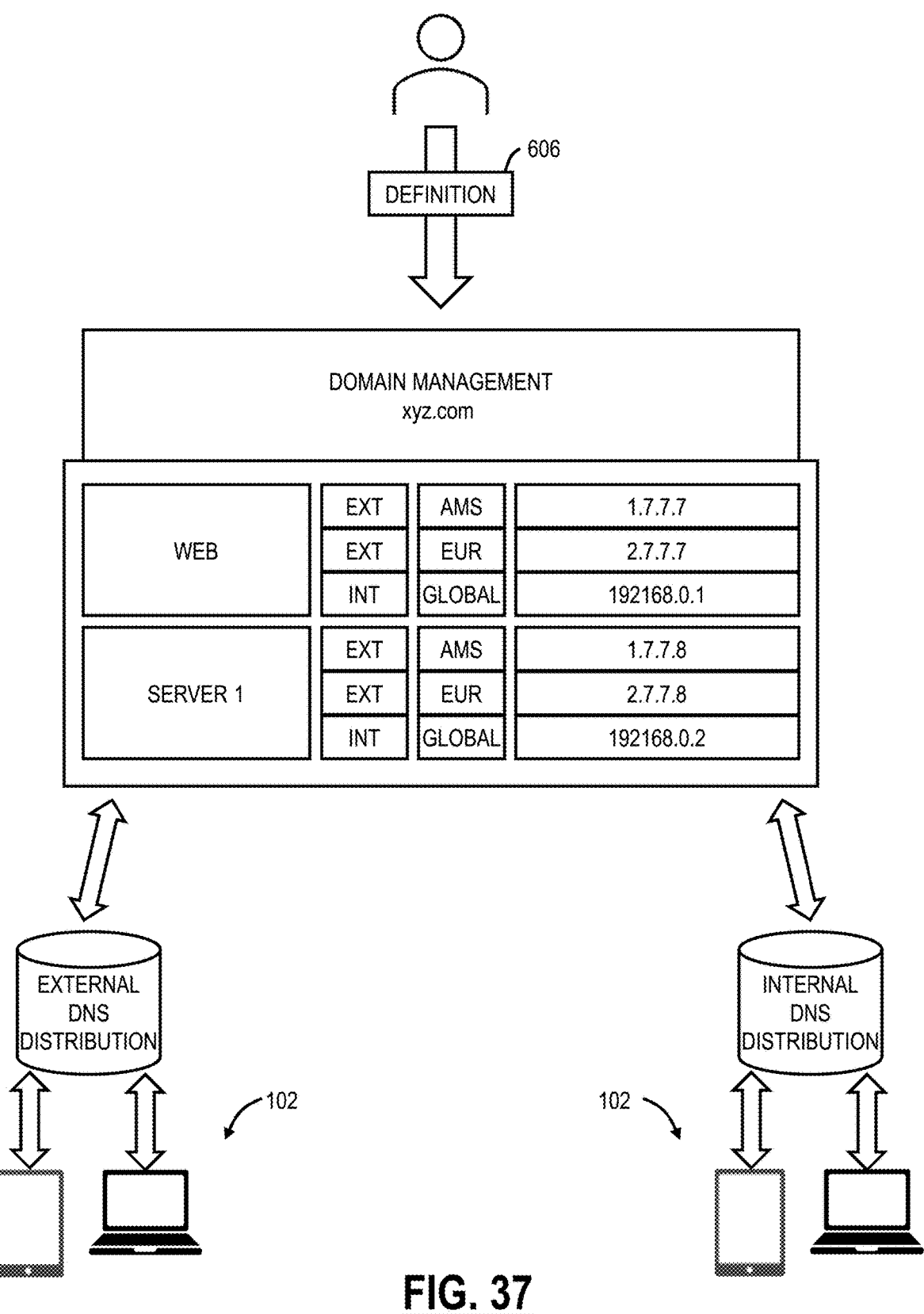
FIG. 37 is a diagram representing the present dynamic distributed name resolution.

FIG. 37 is a diagram representing the present dynamic distributed name resolution. Again, a customer, resource owner, enterprise, etc. can provide a destination service definition 606. This definition can include domains, subdomains, internal/external resolution rules, geo resolution rules, acceptable initiators, conditions for resolution (e.g., client certificate), etc. The present systems can then respond to domain requests based on these definitions and policies/rules. Further, insights can be contributed for policy variation including definition of customer policy, allowed source resolution (e.g., geo, clients, etc.), trusted and untrusted clients, service type (e.g., public, restricted, etc.), etc. By enabling the present systems and methods, enterprises and resource owners can enable DNS resolution for the most effective path, protect enterprise origins, deliver effective inventories, and give insight as to the customer attack surface.

Process for Dynamic Distributed Name Resolution

FIG. 38 is a flow chart of a process 900 for dynamic distributed name resolution. The process 900 includes receiving a request from a user to access a destination service (step 902); resolving an Internet Protocol (IP) address for the destination service based on one or more characteristics of the request (step 904); enforcing one or more controls on the request based on a configuration provided by an owner of the destination service (step 906); and providing access to the destination service to the user based on the one or more controls (step 908).

The process 900 can further include wherein the characteristics can include any of characteristics associated with the user and characteristics associated with the destination service. The characteristics can include any of the initiator, a location of the initiator, a network associated with the initiator, and the type of destination service being requested. The steps can include resolving the request to direct the request to a control layer associated with a cloud-based system; directing the request to the control layer; and enforcing, via the cloud-based system, zero trust policy on the request. The steps can include creating a connection to the destination service based on the configuration and the characteristics. The steps can include resolving an internal IP address for the destination service; and providing access to the destination service. The providing access can include stitching a connection between the user and the destination service through an application on a device associated with the user, one or more nodes of a cloud-based system, and a lightweight connector associated with destination service. The steps can include becoming a Domain Name System (DNS) authority for the destination service and all subdomains associated with the destination service; and directing requests to the destination service or all subdomains based thereon. The steps can include receiving the configuration from the owner, wherein the configuration defines one or more destination services requiring protection, and one or more policies; and based on the request being to one of the one or more destination services requiring protection, enforcing the one or more controls on the request based on the policies. Neither the user nor the destination service share an internet routable network.

Active Exposure and Unwanted Connection Protection

The present systems and methods further include processes for active destination application protection from unwanted exposure to non-approved connection requests. The nature of the underlying routing mechanism of the Internet (TCP/IP) requires that any service that is to be accessed must have a listening service. All layers protecting this service must ultimately allow a network path from the initiator to the destination, or cache a copy of the destination service, in services such as Content Delivery Networks (CDNs). Regardless of the location of the destination service, either connected directly or enhanced with a CDN and/or the control layer, there must be inbound listeners to pass traffic from layer to layer. This inbound listener puts the layers at risk, as anyone on that shared network plane can connect to that listener. This characteristic of TCP referred to as "connect and then authorize" allows for the exposure and risk.

Figure 39:
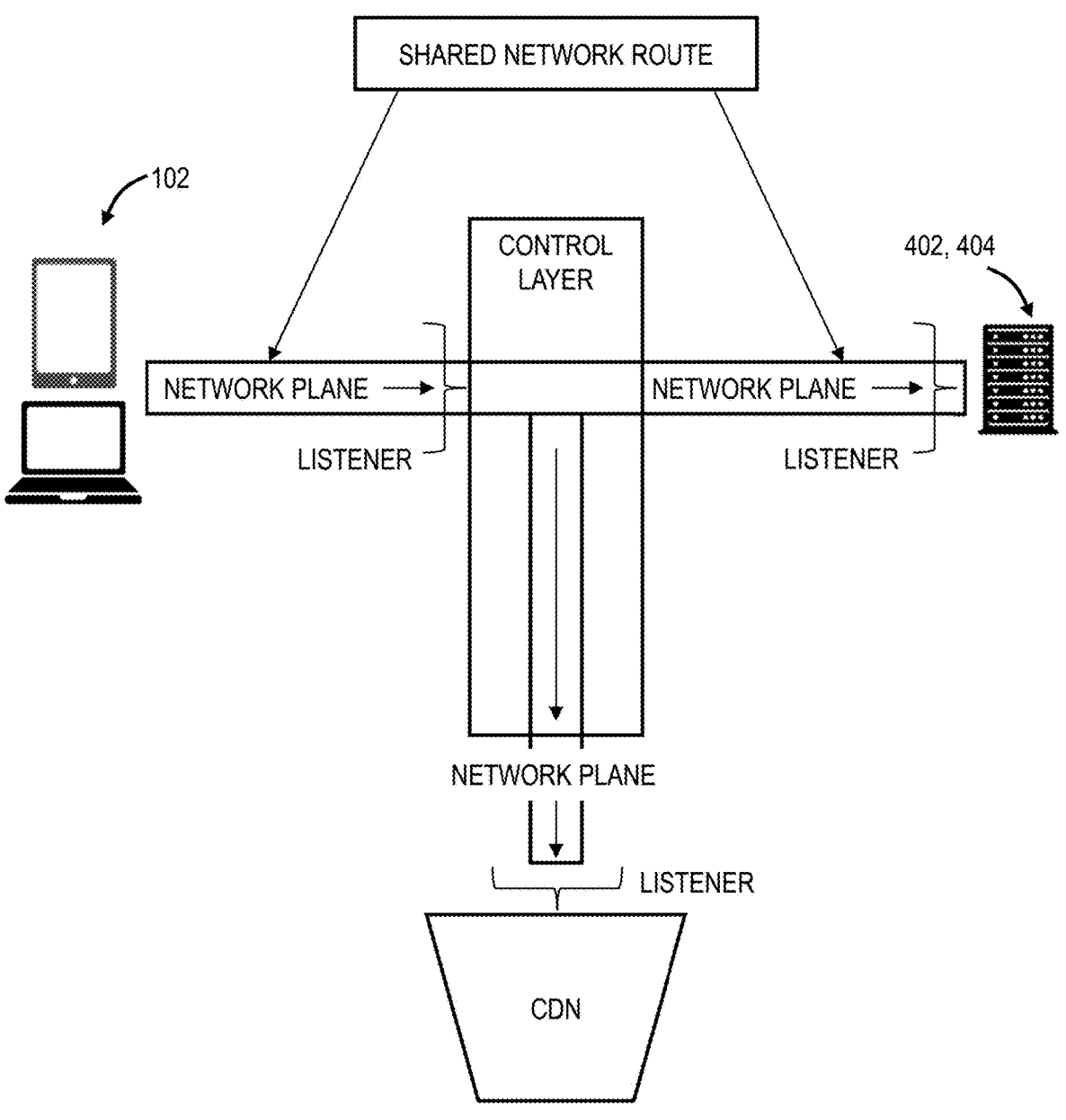
FIG. 39 is a flow diagram of traditional exposed application access on a shared network plane.

FIG. 39 is a flow diagram of traditional exposed application access on a shared network plane. This exposure is greatly increased on an open internet link where anyone connected to the internet can either connect at the IP level or resolve the exposed "inbound" IP address point, such as but not limited to Web Application Firewalls (WAF), CDNs, Load Balancers (LB's) etc. Note this function of resolution and connection at a network layer is outlined in the present disclosure as dynamic name to address resolution.

Figure 40:
FIG. 40 is a flow diagram of traditional web application firewall controls.

FIG. 40 is a flow diagram of traditional web application firewall controls. CDNs and WAFs have been created as services to protect the inbound control layers and the destination/origin services (402, 404). These services attempt to limit the exposure by forcing all traffic destined for a destination/origin services to be filtered and controlled based on a policy of allow/block and cache. These technologies depend on there being a possibility to stop, break, and control traffic from the routable network and then pass the traffic to the controls needed, e.g., application firewalls. These controls then, once the conditions are met, route the request traffic to the destination or onto a content network.

At all points of this interconnected path, there is a reliance on the public routable infrastructure, e.g., non-RFC1918 IPs (IPv4), non-unique local addresses (IPv6), non-NAT addresses, etc. If there is no destination routable address to route to and confirm content, then these services have limited function. Routable network interconnection means that these destination services, WAFs, CDNs, all have to be set up to block malicious inbound content and requests, as anyone can create a connection to the listening service.

The present disclosure provides systems and methods to deliver an active protection of the destination application from exposure to unwanted or non-approved connection requests. This protection is delivered by never exposing the destination listening service to any direct connection. This is achieved by, as described herein, bringing the traffic from the open internet to a control layer, leveraging the functions described herein, applying control to the traffic, and inversing the transportation of the destination service connection so that the workload is protected by a connection plane. That is, a connection plane inverses the connection, so that it initiates the transport layer connection from the location of the destination service. This initialization via outbound call means that the destination service listener is not exposed to the control layer. Any routable network ends at the network control layer and controls are applied before access is granted.

Figure 41:
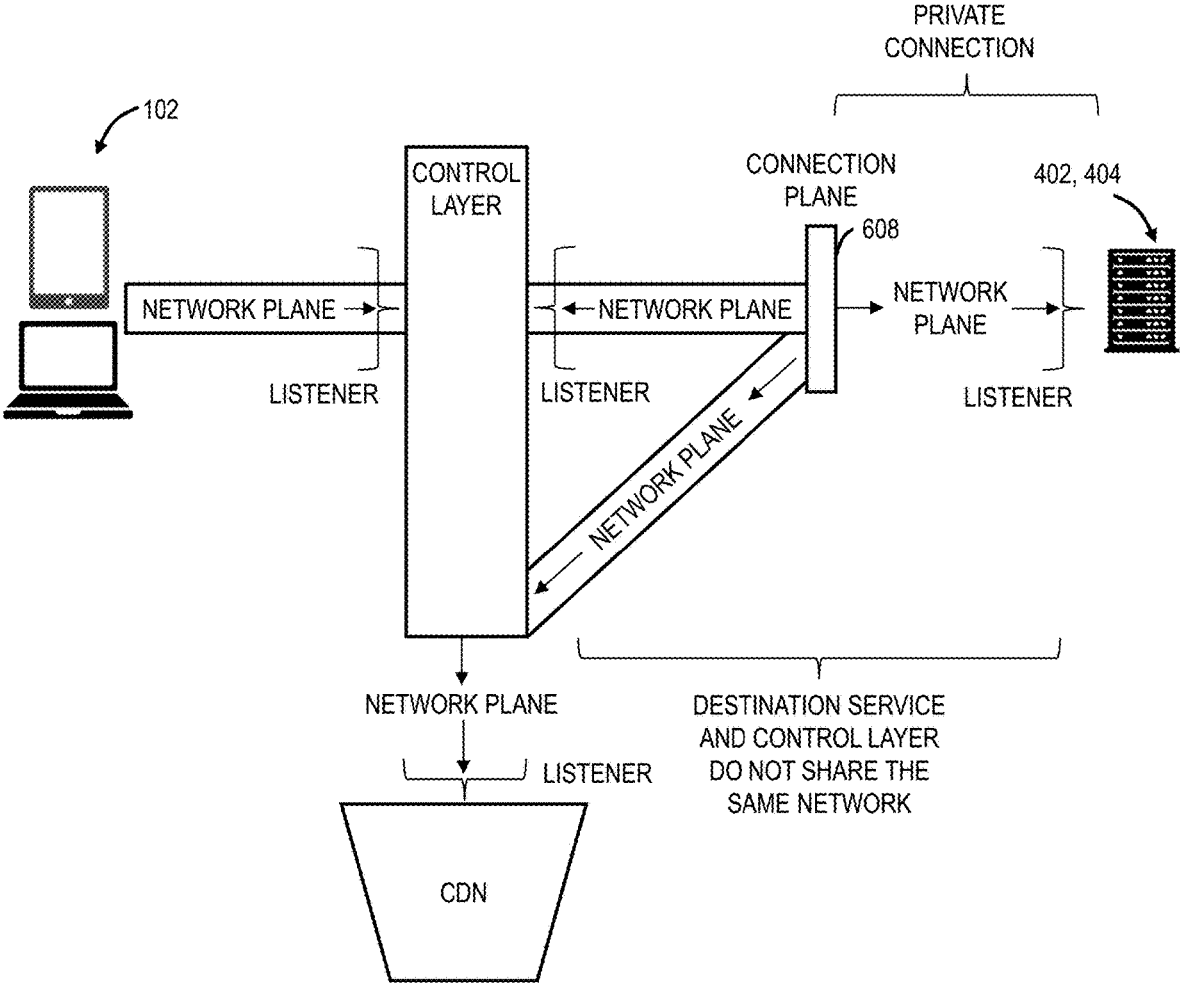
FIG. 41 is a flow diagram of application access through a CDN.

FIG. 41 is a flow diagram of application access through a CDN. The connection plane 608 is intended to be the separation between the internet and the private network space. Thus, allowing for hosting of public applications and services in what would traditionally be an inaccessible environment. The present systems ensure that the connection plane 608 not only provides the inverse path to the Internet, or any other non-private network, but also ensure the application/service (402, 404) is isolated from unauthorized access.

Figure 42:
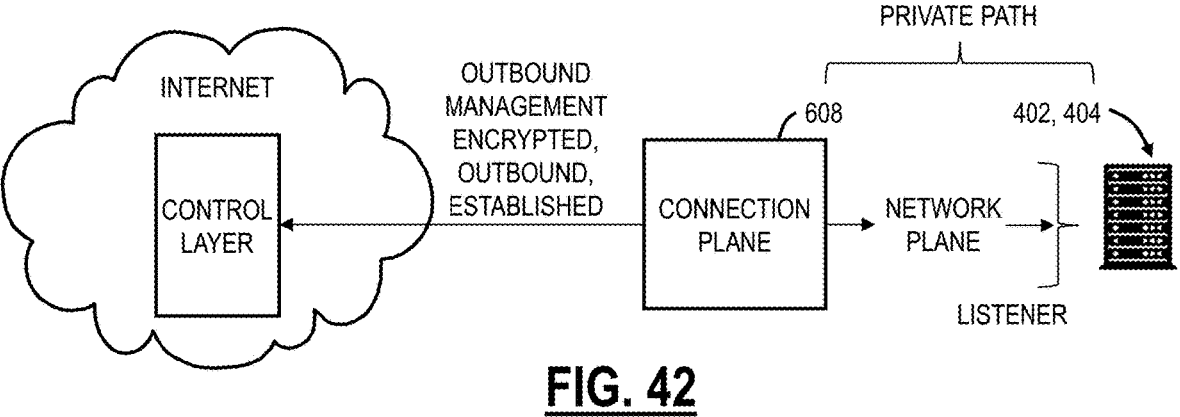
FIG. 42 is a flow diagram of a connection plane to control layer path.

To deliver such functionality, the connection plane 608 can understand and deliver functions such as the ability to scale to meet the deployment and bandwidth requirements of the services (402, 404), the ability to establish connections to the private application/services (402, 404). For outbound management, the connection plane 608 communicates with the control layer through establishing a "connection-plane-initiated" path. That is, the connection plane 608 is the source of the connection. FIG. 42 is a flow diagram of a connection plane to control layer path. This path is leveraged for, but not limited to, signaling of control-layer based instructions on:

policy (e.g., which destination application can be connected too)

external path establishment (e.g., how to establish mul-
tiple, redundant paths to the control layer)-established
via an effective transport tunnel, could be but not
restricted to OSI-layer 4 transport.

internal path establishment (e.g., how to get to the actual
internal service)—this follows the application protocol
such as, but not limited to, TCP22 for SSH application session management (e.g., respecting protocol
standard)

controls to be implemented (e.g., local network blocking)

path to follow (e.g., which path to control layer to follow)
etc.

This control layer communication leverages standard and
encrypted protocols, e.g., Transport Layer Security (TLS),
with the appropriate ability to use modern (and future) key
exchange, cipher security, and data integrity functions.

Figure 43:
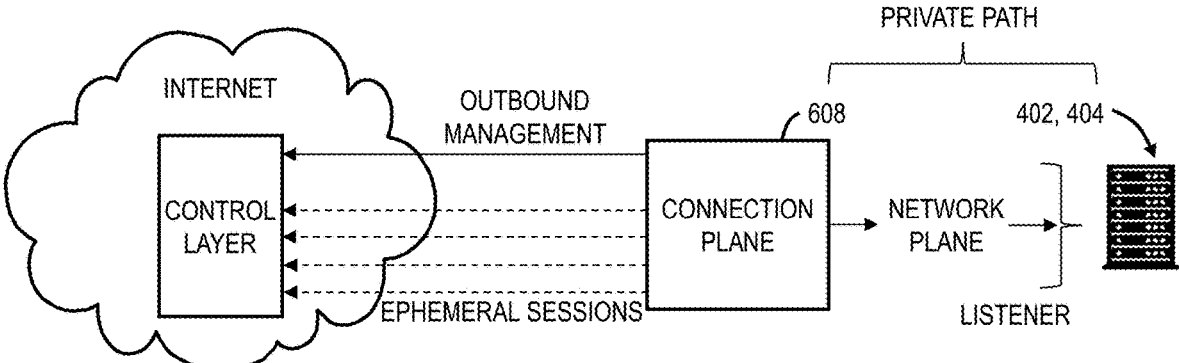
FIG. 43 is a flow diagram of outbound session establishment.

FIG. 43 is a flow diagram of outbound session establish-
ment. Application sessions, when initiated from outside the
control layer, need to have an individual transport path. This
path must be built per-session, to ensure integrity and
security of the application access. Each session transport
must be established ephemerally, so that once the connection
is no longer being used, the transport is torn down. In
addition to the standard protection protocols, the application
sessions must be cryptographically signed so that when
connected to the initiating source, from the internet side of
the control layer, only the correctly signed tunnels can be
connected.

Figure 44:
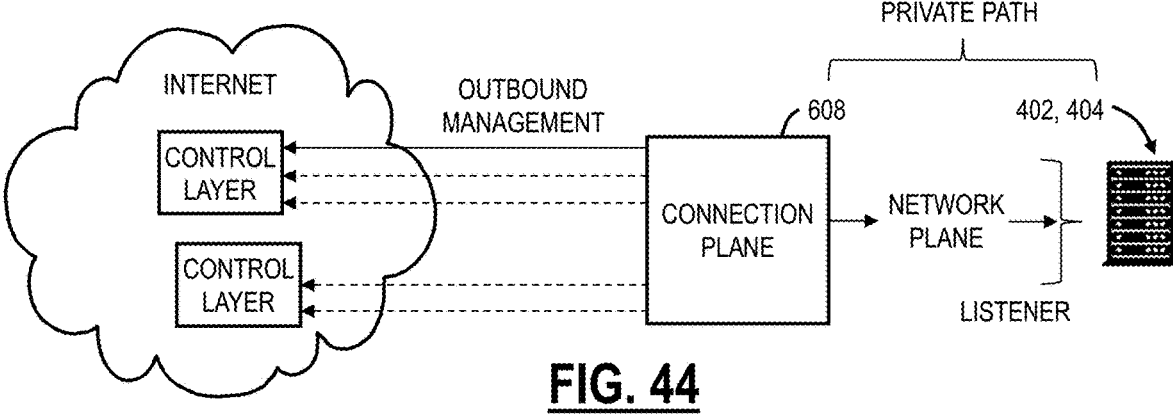
FIG. 44 is a flow diagram of multiple unique sessions.

FIG. 44 is a flow diagram of multiple unique sessions.
These session transports are to be spun-up at the request of
the control layer. Thus, having each session uniquely con-
trolled and protected under the permission of the defined
policy within the control layer. Finally, each session path can
be used to connect to various control layers, allowing for a
distributed connection path. This session-by-session path
establishment allows for application efficiencies and access
enhancements with minimal latency overhead.

Figure 45:
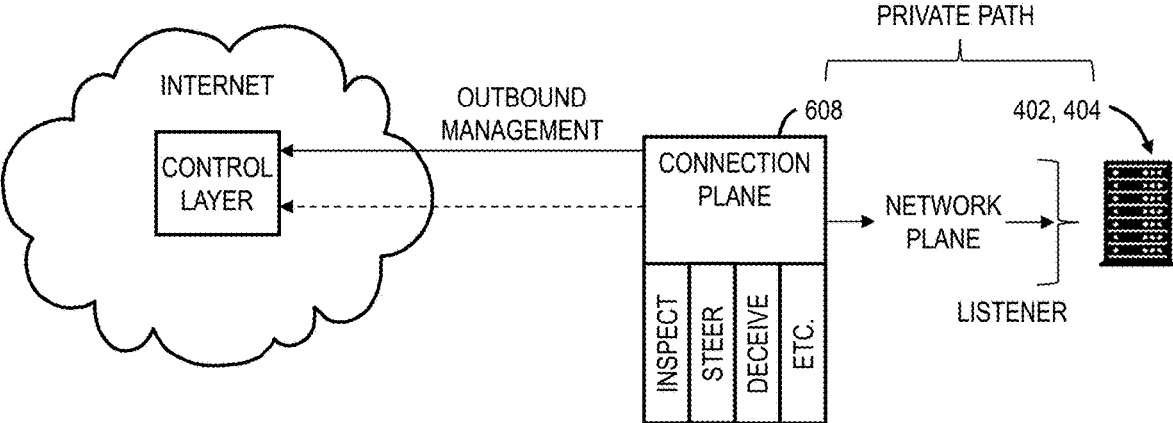
FIG. 45 is a flow diagram of local functions on a connection plane.

FIG. 45 is a flow diagram of local functions on a con-
nection plane. The connection plane 608 element will have
the ability to programmatically and conditionally enable
additional local functions. This allows for the connection
plane 608 to run services, as deemed by the deployment
policy, or at the time of certain condition matching. These
can be set and determined by the control layer. The local
service management allows for global orchestration of func-
tions whenever and wherever it is needed.

The connection plane 608 mechanism must have the
ability to scale in demand to the access requirements on the
destination service. The scale of the connection plane must
adapt vertically, so that more resources can be requested,
e.g., memory, horizontally, for assigning more connection
plane entities to service the demand, and programmatically,
as per the policy, status, signaling and deployment require-
ments of the service. The requirements to determine which
services scale is signaled through the defined outbound
session establishment function. Thus, allowing for the con-
trol layer, under the deployed requirements to scale to the
needed conditions.

Figures 46, 47:
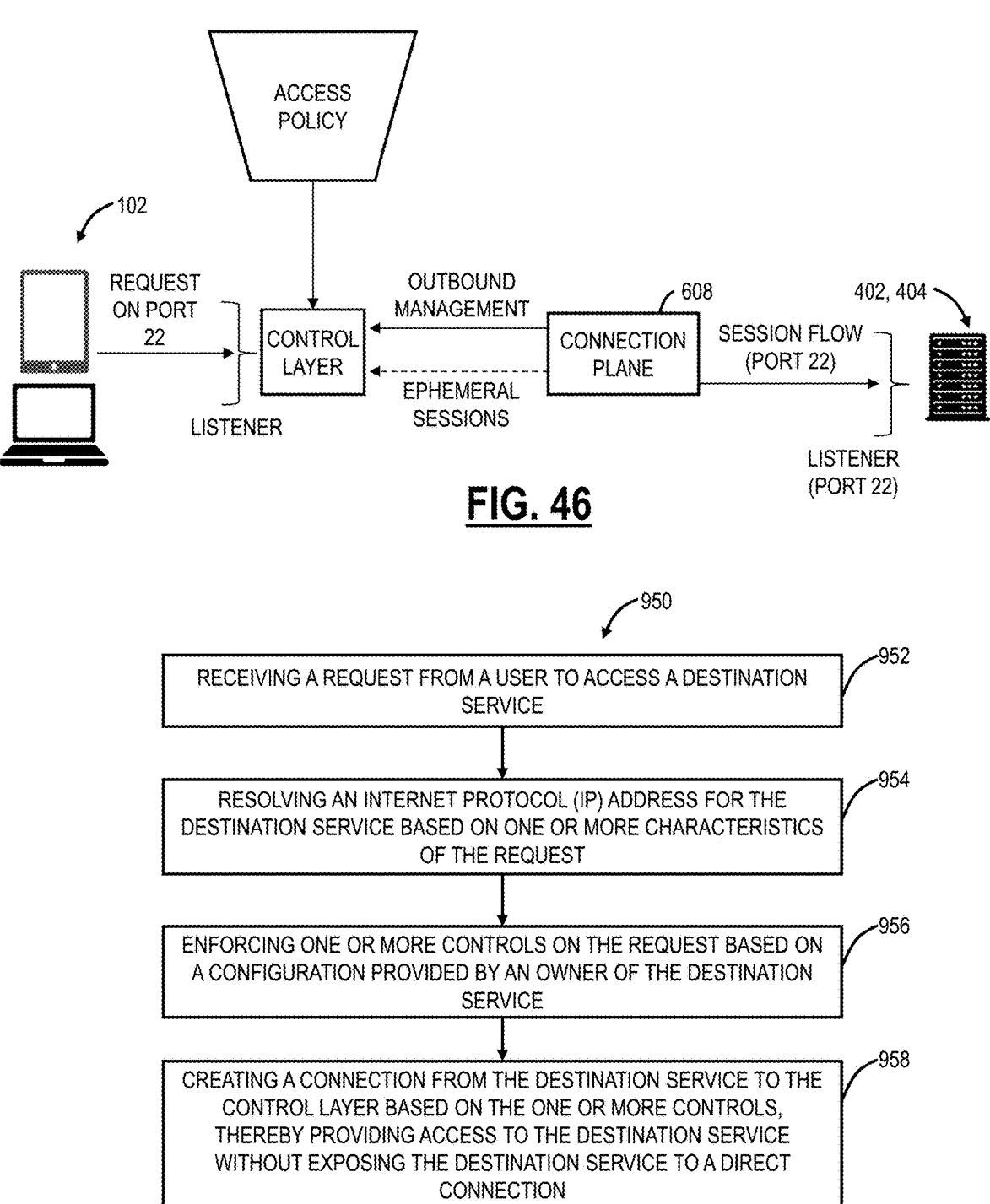
FIG. 46 is a flow diagram of a user connecting to a destination service through a control layer and a connection plane.
FIG. 47 is a flow chart of a process for active exposure and unwanted connection protection.

FIG. 46 is a flow diagram of a user connecting to a
destination service through a control layer and a connection
plane. The method that establishes the connections to the
internal services (destination service) must respect the appli-
cation protocols (and conditions) of the initiating service.
Thus, signaling from the control layer must be respected as
the session is established. The connection/session will be
managed between the connection plane 608 and the desti-
nation application (402, 404), under the supervision of the control layer. Once instructed by the control layer (after
permission/authorization has been granted from the control
layer) the connection plane 608 establishes the connection to
the destination service (402, 404). All application data,
traffic, etc. will then return the content to the internet based
initiator, via the unique session path created by the connec-
tion plane 608.

In the example shown in FIG. 46, an initiator 102 requests
a destination service (402, 404). Via the DNS processes
described herein, this request will be resolved and sent to the
control layer. The initiator will then be connected to the
destination service (402, 404) via the connection plane a
described herein based on access policy. That is, the present
systems provide a mechanism of active destination applica-
tion protection from unwanted exposure to non-approved
connection requests. In order to access a destination func-
tion, the initiating source must have authorization to access
the service. Even once access is granted, the destination
service will not be connected to a shared network, or set of
network controls with the initiator, allowing the destination
services to live in a non-exposed state.

Process for Active Exposure and Unwanted Connection
Protection

FIG. 47 is a flow chart of a process 950 for active
exposure and unwanted connection protection. The process
950 includes receiving a request from a user to access a
destination service (step 952); directing the request to a
control layer (step 954); enforcing one or more controls, via
the control layer, on the request based on a configuration
provided by an owner of the destination service (step 956);
and creating a connection from the destination service to the
control layer based on the one or more controls, thereby
providing access to the destination service without exposing
the destination service to a direct connection (step 958).

The process 950 can further include wherein the connec-
tion is created on a per-session basis, and wherein respon-
sive to a session being closed, the steps further comprise
tearing down the associated connection. The connection can
be ephemeral, thereby blocking any data from being per-
sisted or stored. The connection can be created based on a
request from the control layer. Creating a connection can
include creating a connection from a connection plane to the
control layer and creating a connection from the connection
plane to the destination service. The connection plane can be
adapted to enforce one or more controls via local functions.
The connection between the connection plane and the des-
tination service can be created based on authorization
granted by the control layer. The steps can further include
becoming a Domain Name Service (DNS) authority for the
destination service; and directing requests for the destination
service to the control layer based thereon. The destination
service can be a public destination service. The steps can
further include receiving the configuration from the owner,
wherein the configuration defines one or more destination
services requiring protection, and one or more policies; and
based on the request being to one of the one or more
destination services requiring protection, enforcing the one
or more controls on the request based on the policies.

CONCLUSION

It will be appreciated that some embodiments described
herein may include one or more generic or specialized
processors ("one or more processors") such as microproces-
sors; Central Processing Units (CPUs); Digital Signal Pro-
cessors (DSPs): customized processors such as Network
Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
receiving a destination service definition for a destination service from a customer, wherein the destination service definition includes (i) a fully qualified domain name of the destination service, (ii) a function and type of the destination service, and (iii) context identifying how and where the destination service is hosted;
performing an assessment of the destination service including inferring, using the destination service definition, known information about the destination service and collecting unknown information about the destination service through an assessment phase, to determine one or more policies to use for the destination service;

responsive to receiving a request from a user to access the destination service, directing the request to a control layer, and enforcing one or more controls on the request based on the determined one or more policies;
providing access to the destination service to the user based on the one or more controls;
performing ongoing assessments of the destination service at predefined intervals;
identifying one or more changes associated with the destination service; and
enforcing one or more controls on requests to the destination service, wherein the one or more controls include adding one or more access blocks of the destination service and updating one or more access policies for the destination service, based on the changes.

2. The method of claim 1, wherein the steps further comprise:
providing one or more policy recommendations to the customer based on the assessment.

3. The method of claim 1, wherein the steps further comprise:
providing one or more policy recommendations to the customer based on the changes.

4. The method of claim 1, wherein determining the one or more policies to use for the destination service is based on information associated with the destination service identified during the assessment, and wherein the information includes known and unknown information.

5. The method of claim 1, wherein the destination service is associated with a domain, and the steps further comprise:
becoming an authority for a specific subdomain, or all subdomains associated with the domain; and
directing requests to the specific subdomain or all subdomains based thereon.

6. The method of claim 1, wherein the destination service is a public destination service.

7. The method of claim 6, wherein the directing includes one of directing the request to the control layer and directing the request directly to the public destination service based on a configuration.

8. The method of claim 1, wherein the providing access includes stitching a connection between the user and the destination service through an application executing on a device associated with the user, one or more nodes of a cloud-based system, and a lightweight connector associated with the destination service.

9. The method of claim 1, wherein the destination service is associated with a domain, and the steps further comprise:
identifying one or more subdomains associated with the domain; and
enforcing the one or more controls on requests to the one or more subdomains.

10. A non-transitory computer-readable medium comprising instructions that, when executed, cause one or more processors to perform steps of:
receiving a destination service definition for a destination service from a customer, wherein the destination service definition includes (i) a fully qualified domain name of the destination service, (ii) a function and type of the destination service, and (iii) context identifying how and where the destination service is hosted;
performing an assessment of the destination service including inferring, using the destination service definition, known information about the destination service and collecting unknown information about the destination service through an assessment phase, to determine one or more policies to use for the destination service;

responsive to receiving a request from a user to access the destination service, directing the request to a control layer, and enforcing one or more controls on the request based on the determined one or more policies;

providing access to the destination service to the user based on the one or more controls;

performing ongoing assessments of the destination service at predefined intervals;

identifying one or more changes associated with the destination service; and enforcing one or more controls on requests to the destination service, wherein the one or more controls include adding one or more access blocks of the destination service and updating one or more access policies for the destination service, based on the changes.

11. The non-transitory computer-readable medium of claim 10, wherein the steps further comprise:

providing one or more policy recommendations to the customer based on the assessment.

12. The non-transitory computer-readable medium of claim 10, wherein the steps further comprise:

providing one or more policy recommendations to the customer based on the changes.

13. The non-transitory computer-readable medium of claim 10, wherein determining the one or more policies to use for the destination service is based on information associated with the destination service identified during the assessment, and wherein the information includes known and unknown information.

14. The non-transitory computer-readable medium of claim 10, wherein the destination service is associated with a domain, and the steps further comprise:

becoming an authority for a specific subdomain, or all subdomains associated with the domain; and directing requests to the specific subdomain or all subdomains based thereon.

15. The non-transitory computer-readable medium of claim 10, wherein the destination service is a public destination service.

16. The non-transitory computer-readable medium of claim 15, wherein the directing includes one of directing the request to the control layer and directing the request directly to the public destination service based on a configuration.

17. The non-transitory computer-readable medium of claim 10, wherein the providing access includes stitching a connection between the user and the destination service through an application executing on a device associated with the user, one or more nodes of a cloud-based system, and a lightweight connector associated with the destination service.

18. The non-transitory computer-readable medium of claim 10, wherein the destination service is associated with a domain, and the steps further comprise:

identifying one or more subdomains associated with the domain; and enforcing the one or more controls on requests to the one or more subdomains.

* * * * *